United States Patent
Ren

(10) Patent No.: US 9,596,367 B2
(45) Date of Patent: Mar. 14, 2017

(54) FUNCTION PERFORMING DEVICE, NON-TRANSITORY COMPUTER-READABLE RECORDING MEDIUM STORING COMPUTER-READABLE INSTRUCTIONS FOR TERMINAL DEVICE, AND FUNCTION PERFORMING SYSTEM

(71) Applicant: Brother Kogyo Kabushiki Kaisha, Nagoya-shi, Aichi-ken (JP)

(72) Inventor: Yongyong Ren, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/082,114

(22) Filed: Mar. 28, 2016

(65) Prior Publication Data
US 2016/0337532 A1 Nov. 17, 2016

(30) Foreign Application Priority Data
May 12, 2015 (JP) ................. 2015-097397

(51) Int. Cl.
*G06F 3/12* (2006.01)
*H04N 1/00* (2006.01)

(52) U.S. Cl.
CPC ..... *H04N 1/00244* (2013.01); *H04N 1/00204* (2013.01); *H04N 2201/0039* (2013.01); *H04N 2201/0055* (2013.01); *H04N 2201/0094* (2013.01)

(58) Field of Classification Search
None
See application file for complete search history.

(56) References Cited

U.S. PATENT DOCUMENTS 9,086,832 B2 7/2015 Maekawa et al.
2012/0229845 A1 9/2012 Maekawa et al.
(Continued)

FOREIGN PATENT DOCUMENTS

| JP | 2003-046695 A | 2/2003 |
| JP | 2012-187867 A | 10/2012 |
| JP | 2014192823 A | * 10/2014 |

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Thomas D Lee
(74) *Attorney, Agent, or Firm* — Banner & Witcoff, Ltd.

(57) ABSTRACT

A function performing device may register device information in the mediation server. The device information may include network information which is related to a network to which the function performing device is currently belonging or to which the function performing device is to belong. The function performing device may obtain a first performing instruction from a terminal device not via the mediation server but via the network as a result of the terminal device having joined the network by using the network information, obtain a second performing instruction from the mediation server as a result of the terminal device having supplied a supplying instruction to the mediation server without joining the network, and perform a function in a case where the first or second performing instruction is obtained.

18 Claims, 10 Drawing Sheets

(56) References Cited

U.S. PATENT DOCUMENTS

2012/0243041 A1\* 9/2012 Sakurai ................ G06F 3/1208
 358/1.15
2013/0258399 A1\* 10/2013 Nanaumi ............. G06K 15/405
 358/1.15
2014/0247459 A1 9/2014 Maekawa et al.

\* cited by examiner

FIG. 6 (Scan Process (Sequel to Fig. 3))

(Second Embodiment)

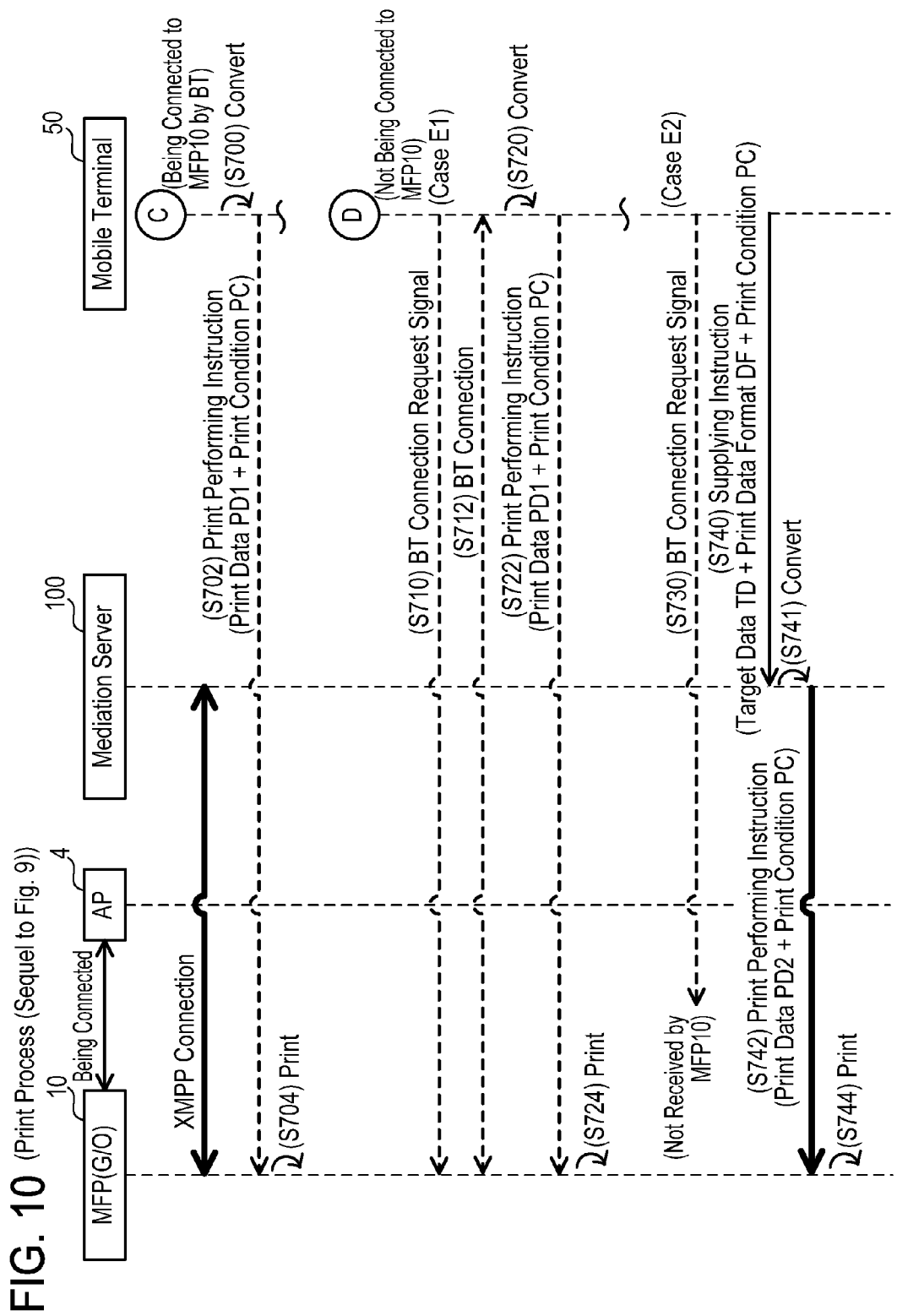

FUNCTION PERFORMING DEVICE, NON-TRANSITORY COMPUTER-READABLE RECORDING MEDIUM STORING COMPUTER-READABLE INSTRUCTIONS FOR TERMINAL DEVICE, AND FUNCTION PERFORMING SYSTEM

CROSS-REFERENCE TO RELATED APPLICATION

This application claims priority to Japanese Patent Application No. 2015-097397, filed on May 12, 2015, the entire contents of which are hereby incorporated by reference into the present application.

TECHNICAL FIELD

The present application discloses a technology of a terminal device causing a function performing device to perform a function.

BACKGROUND ART

In a generally known communication system, when a user uses a PC to perform an operation for causing a printer to perform a print, the PC sends print data to a server. When the print data is stored in the server, the server sends a predetermined notification to the printer. When the predetermined notification is received, the printer obtains the print data from the server, and prints an image represented by the print data.

SUMMARY

As described above, until the printer receives the predetermined notification, the communication of the print data from the PC to the server, and the communication of the predetermined notification from the server to the printer need to be performed. Thus, in a configuration in which an instruction (i.e., the predetermined notification) related to performing a print is supplied from the server to the printer, the printer may need a long time until the instruction is obtained, and therefore a long time may be needed until the printer performs a print. Further, this is not restricted to printing, and a similar problem may occur in a configuration in which an instruction related to performing a scan is supplied from the server to a scanner. In the present disclosure, a technique that a function performing device may quickly obtain a function performing instruction is provided.

A function performing device may comprise: a first function performing engine configured to perform a first function; a processor; and a memory that stores computer-readable instructions therein, the computer-readable instructions, when executed by the processor, causing the function performing device to perform: supplying device information which is related to the function performing device to a mediation server so as to register the device information in the mediation server, the device information including network information which is related to a network to which the function performing device is currently belonging or to which the function performing device is to belong; obtaining a first performing instruction of the first function from a terminal device not via the mediation server but via the network as a result of the terminal device having joined the network by using the network information included in the device information registered in the mediation server; obtaining a second performing instruction of the first function from the mediation server as a result of the terminal device having supplied a first supplying instruction to the mediation server without joining the network by using the network information included in the device information registered in the mediation server, the first supplying instruction being for causing the mediation server to supply the second performing instruction to the function performing device; and causing the first function performing engine to perform the first function in a case where the first performing instruction or the second performing instruction is obtained.

The present application further discloses a non-transitory computer-readable recording medium storing computer-readable instructions for a terminal device. The computer-readable instructions, when executed by a processor of the terminal device, may cause the terminal device to perform: obtaining device information from a mediation server after the device information has been registered in the mediation server by a function performing device, the device information including network information which is related to a wireless network to which the function performing device is currently belonging or to which the function performing device is to belong; attempting to join the wireless network by using the network information included in the obtained device information; supplying a first function performing instruction to the function performing device not via the mediation server but via the wireless network in a case where the terminal device has joined the wireless network as a result of the attempting; and supplying a supplying instruction to the mediation server in a case where the terminal device has not joined the wireless network as a result of the attempting, the supplying instruction being for causing the mediation server to supply a second function performing instruction to the function performing device.

A control method and computer-readable instructions for implementation of the function performing device described above, and a non-transitory computer-readable recording medium in which the computer-readable instructions are stored, are also novel and useful. Moreover, the terminal device itself described above is also novel and useful. Moreover, a function performing system comprising the function performing device and the terminal device which are described above is also novel and useful.

BRIEF DESCRIPTION OF DRAWINGS

FIG. 10 shows a sequence chart for a print process which is sequel to the FIG. 9.

EMBODIMENTS

Figure 1:
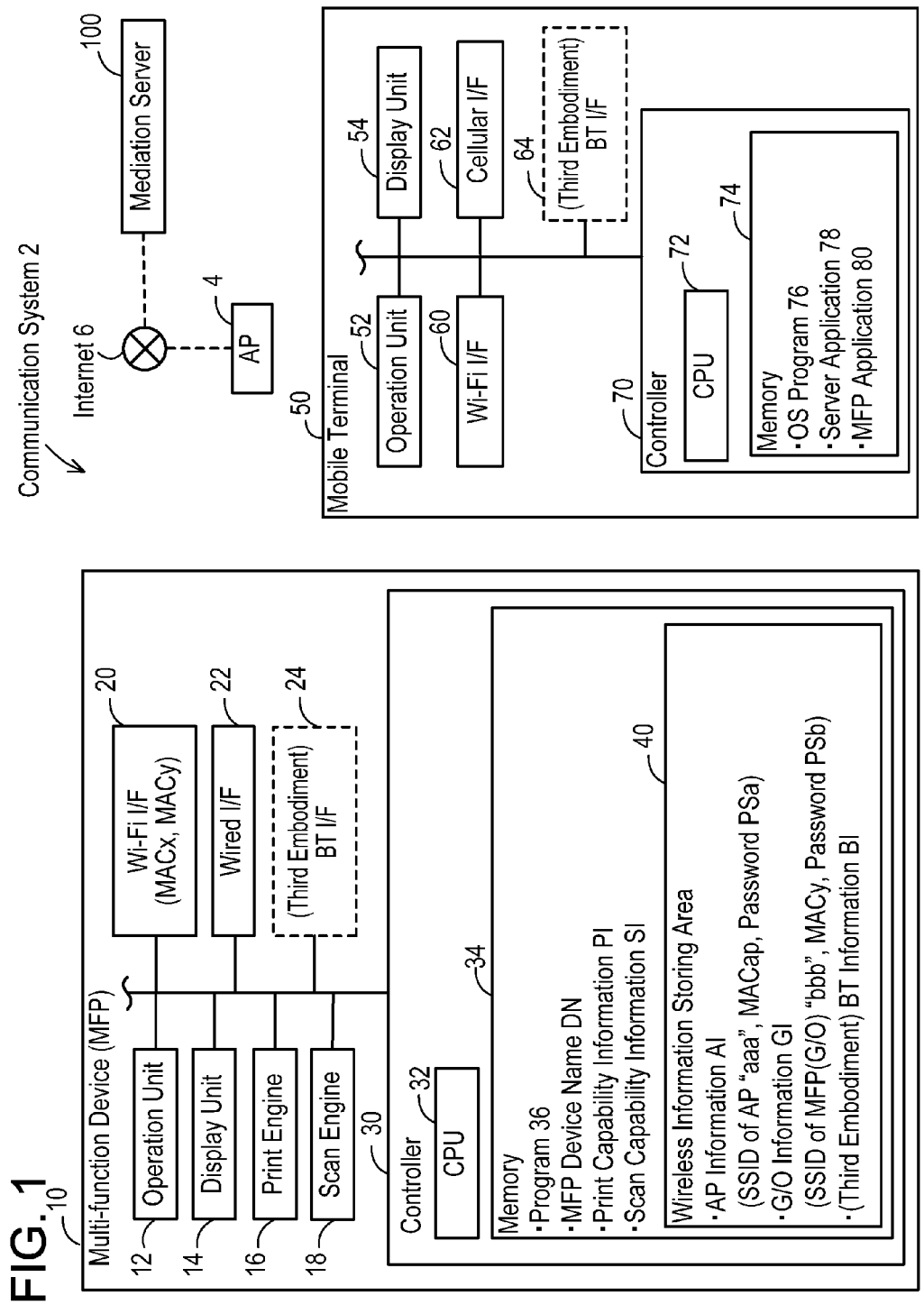
FIG. 1 shows a configuration of a communication system.

First Embodiment (Configuration of Communication System 2)
As shown in FIG. 1, a communication system 2 comprises a multi-function device 10 and a mobile terminal 50. The multi-function device 10 is connected to the Internet 6 via a wired network or wireless network, and is capable of communicating with a mediation server 100 on the Internet 6. The mobile terminal 50 is connected to the Internet 6 via a wireless network, and is capable of communicating with the mediation server 100 on the Internet 6. Further, in a case where the multifunction device 10 and the mobile terminal 50 belong to a same wireless network, the multi-function device 10 and the mobile terminal 50 can communicate with each other via that wireless network. Moreover, below, the multifunction device 10 will be described as "MFP (abbreviation of Multi-Function Peripheral) 10", and the network will be described as "NW".

(Configuration of MFP 10)

The MFP 10 is a peripheral apparatus (i.e., a peripheral apparatus of the mobile terminal 50, or the like) capable of performing a plurality of functions including at least a print function and a scan function. The MFP 10 comprises an operation unit 12, a display unit 14, a print engine 16, a scan engine 18, a Wi-Fi interface 20, a wired interface 22, and a controller 30. The units 12 to 30 are connected to a bus wire (not shown). Moreover, below, interface will be described as "I/F".

The operation unit 12 comprises a plurality of keys. A user can input various instructions to the MFP 10 by operating the operation unit 12. The display unit 14 is a display for displaying various information. The display unit 14 functions as a so-called touch panel. That is, the display unit 14 also functions as an operation unit operated by the user. The print engine 16 comprises a printing mechanism such as an ink jet method, laser method, etc. The scan engine 18 comprises a scan mechanism such as a CCD (abbreviation of Charge Coupled Device), CIS (abbreviation of Contact Image Sensor), etc. The wired I/F 22 is an I/F for performing wired communication, and comprises a socket for inserting a wire cable.

The Wi-Fi I/F 20 is an I/F for performing a wireless communication in accordance with the Wi-Fi scheme. The Wi-Fi scheme is a wireless communication scheme conforming to the standards developed by the Wi-Fi Alliance, e.g., IEEE (abbreviation of The Institute of Electrical and Electronics Engineers, Inc.) standard 802.11 and standards conforming thereto (e.g., 802.11a, 11b, 11g, 11n, etc.). More specifically, the Wi-Fi I/F 20 supports the WFD (abbreviation of Wi-Fi Direct (registered trademark)) scheme developed by the Wi-Fi Alliance. The WFD scheme is a wireless communication scheme described in the specifications "Wi-Fi Peer-to-Peer (P2P) Technical Specification Version 1.1" created by the Wi-Fi Alliance.

MACx and MACy, which are two different MAC addresses, are allocated in the Wi-Fi I/F 20. MACx is a MAC address for the MFP 10 to join a wireless NW (called "APNW" below) formed by an AP (abbreviation of Access Point) 4, i.e., is a MAC address for identifying the MFP 10 in the APNW. MACy is a MAC address used for the MFP 10 to form a wireless NW (called "WFDNW" below) in accordance with the WFD scheme, i.e., is a MAC address for identifying the MFP 10 in the WFDNW.

The controller 30 comprises a CPU 32 and a memory 34. The CPU 32 performs various processes in accordance with a program 36 stored in the memory 34. The memory 34 is configured by a volatile memory, non-volatile memory, or the like. In addition to the program 36, the memory 34 stores an MFP device name DN, print capability information PI, and scan capability information SI.

The MFP device name DN is a name of the MFP 10. The print capability information PI is information indicating a print function capability which can be used by the MFP 10, and indicates print data format (e.g., JPEG (abbreviation of Joint Photographic Experts Group), etc.) which can be interpreted by the print engine 16, one or more number of print colors (e.g., color print, monochrome print), one or more printing paper sizes (e.g., A3, A4, B4, etc.), and one or more print resolutions (e.g., 600 dpi, 300 dpi). The scan capability information SI is information indicating a scan function capability which can be used by the MFP 10, and indicates one or more output data formats (e.g., JPEG, PDF (abbreviation of Portable Document Format), etc.), one or more number of scan colors (e.g., color scan, monochrome scan), one or more read document sizes (e.g., A3, A4, B4, etc.), and one or more scan resolutions (e.g., 600 dpi, 300 dpi).

The memory 34 further comprises a wireless information storing area 40. In a state where the MFP 10 is joined to the APNW, AP information AI which is related to the APNW, i.e., AP information AI which is related to the AP 4 is stored in the wireless information storing area 40. The AP information AI includes an SSID (abbreviation of Service Set Identifier) "aaa", a MACap, and a password PSa. The SSID "aaa" is an identifier for identifying the APNW. The MACap is a MAC address of the AP 4. The password PSa is information used for authentication and encryption in the APNW.

In a state where the MFP 10 is belonging to the WFDNW, G/O information GI related to the WFDNW is stored in the wireless information storing area 40. In the present embodiment, while power of the MFP 10 is ON, the MFP 10 constantly operates as a Group Owner (called "G/O" below) of the WFD scheme, forming the WFDNW. Consequently, while power of the MFP 10 is ON, the G/O information GI is constantly being stored. The G/O information GI includes SSID "bbb", MACy, and password PSb. The SSID "bbb" is an identifier for identifying the WFDNW. The password PSb is information used for authentication and encryption in the WFDNW.

(Configuration of Mobile Terminal 50)

The mobile terminal 50 is a portable terminal device such as a mobile telephone, a smartphone, a notebook PC, a tablet PC, etc. The mobile terminal 50 comprises an operation unit 52, a display unit 54, a Wi-Fi I/F 60, a cellular I/F 62, and a controller 70. Each of the units 52 to 70 is connected to a bus wire (not shown).

The operation unit 52 is configured by a plurality of keys. The user can input various instructions to the mobile terminal 50 by operating the operation unit 52. The display unit 54 is a display for displaying various information. The display unit 54 functions as a so-called touch panel. That is, the display unit 54 also functions as an operation unit operated by the user. The Wi-Fi I/F 60 is an I/F for performing a wireless communication in accordance with the Wi-Fi scheme. The cellular I/F 62 is an I/F for performing a wireless communication in accordance with a cellular scheme. The cellular scheme is an international wireless communication scheme (e.g., 3G (3rd Generation), 4G (4th Generation), etc.) conforming to standards developed by the International Telecommunication Union.

The controller 70 comprises a CPU 72 and a memory 74. The CPU 72 performs various processes in accordance with programs 76, 78, 80 stored in the memory 74. The memory 74 is configured by a volatile memory, non-volatile memory, etc. In addition to an OS (abbreviation of Operating System) program 76 for realizing basic processing, the memory 74 stores a server application 78 and an MFP application 80. Further, the memory 74 stores the AP information AI in a state of the mobile terminal 50 being joined the APNW, and stores the G/O information GI in a state of the mobile terminal 50 being joined the WFDNW.

The server application 78 is an application for using the mediation server 100, e.g., is installed on the mobile terminal 50 from a server (not shown) provided by an operator who manages the mediation server 100 on the Internet 6. The MFP application 80 is an application for using the MFP 10, e.g., may be installed on the mobile terminal 50 from a server (not shown) provided by a vendor of the MFP 10 on the Internet 6, or may be installed on the mobile terminal 50 from a media shipped together with the MFP 10.

(Configuration of AP 4)

The AP 4 is a known AP called a wireless AP, wireless LAN router, etc. The AP 4 relays communication between a pair of apparatuses which have established a wireless connection with the AP 4, i.e., a pair of apparatuses (e.g., the MFP 10, the mobile terminal 50) which are belonging to the APNW formed by the AP 4. Further, the AP 4 may function as a router, and perform communication with an apparatus (e.g., the mediation server 100) on the Internet 6. In this case, the AP 4 relays communication between an apparatus (e.g., the MFP 10) belonging to the APNW, and an apparatus (e.g., the mediation server 100) on the Internet 6.

(Configuration of Mediation Server 100)

The mediation server 100 is a server provided on the Internet 6 by Google (registered trademark), and mediates communication for the mobile terminal 50 to cause the MFP 10 to perform the print function or scan function.

Figure 2:
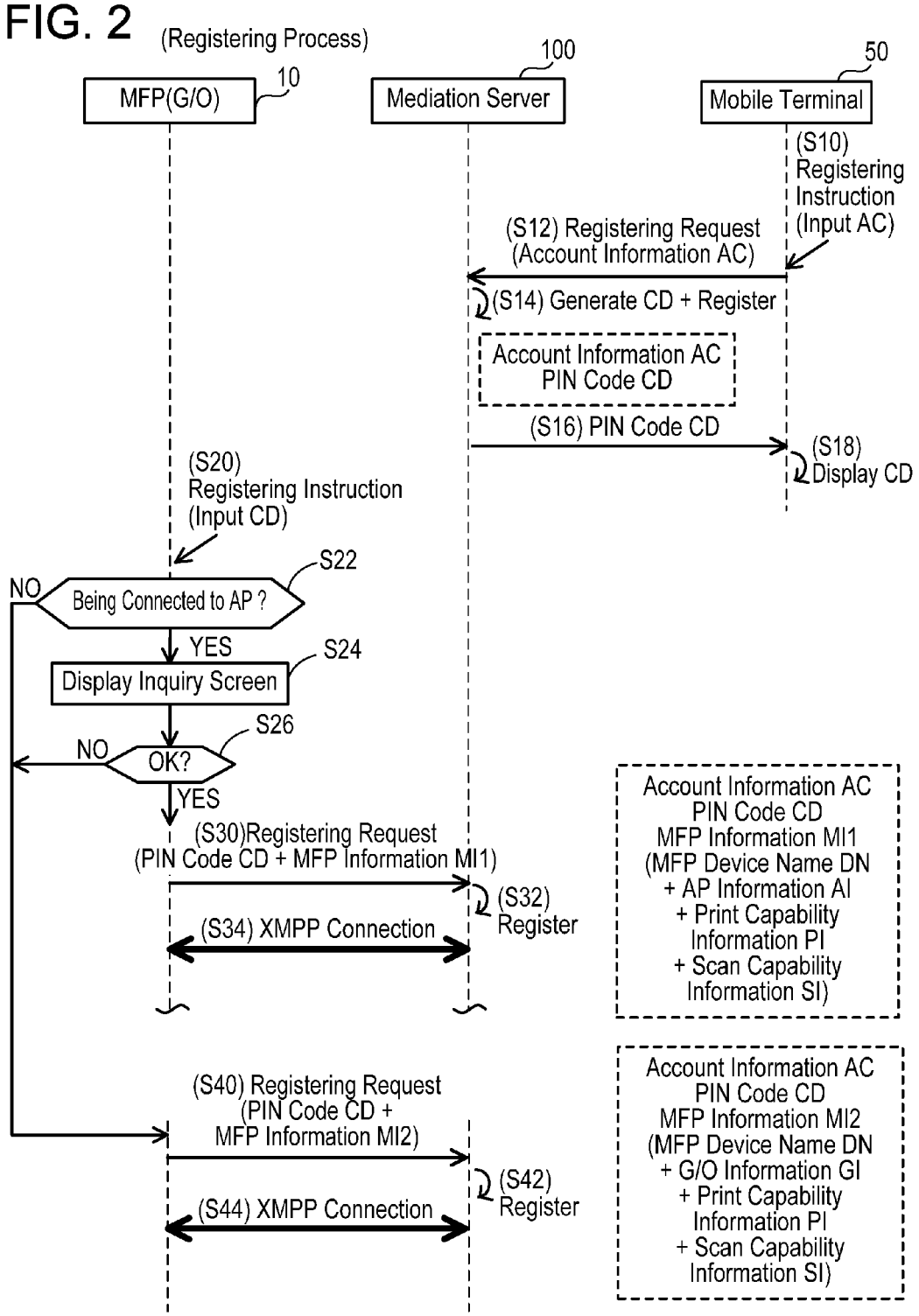
FIG. 2 shows a sequence chart for a registering process.

(Registering Process; FIG. 2)

Next, contents of processes performed by the devices 10, 50, 100 will be described with reference to FIG. 2 to FIG. 7. First, the contents of a registering process will be described with reference to FIG. 2. Although not shown, when power is turned ON, the CPU 32 of the MFP 10 starts operating as the G/O of the WFD scheme, prepares the G/O information GI and stores the G/O information GI in the memory 34. Specifically, the CPU 32 prepares, e.g., the SSID "bbb" by randomly generating a character string and, further, prepares the password PSb by randomly generating a character string. The CPU 32 prepares the MACy which has been determined in advance.

In S10, the CPU 72 of the mobile terminal 50 receives a registering instruction from the user. The registering instruction of S10 includes an operation for starting the server application 78, and an operation for inputting account information AC for using the mediation server 100. The CPU 72 causes the input account information AC to be stored in the memory 74. S12 and S18, which are subsequent to S10, are performed in accordance with the server application 78.

In a case where the registering instruction of S10 is received, in S12, the CPU 72 of the mobile terminal 50 supplies a registering request including the input account information AC to the mediation server 100. The registering request of S12 is a command for requesting the mediation server 100 for registration of the account information AC. For example, in a case where the mobile terminal 50 is joined to the APNW and the AP 4 is functioning as a router, the CPU 72 supplies the registering request to the mediation server 100 via the Wi-Fi I/F 60 by using the APNW (i.e., via the AP 4). Further, e.g., in a case where the mobile terminal 50 has established a wireless connection with a base station of the cellular scheme, i.e., in a case where the mobile terminal 50 is joined to a cellular NW, the CPU 72 supplies the registering request to the mediation server 100 via the cellular I/F 62 by using the cellular NW.

In a case where the registering request of S12 is obtained from the mobile terminal 50, in S14 the mediation server 100 generates a PIN code CD, and stores (i.e., registers) the account information AC in the registering request and the generated PIN code CD in association with one another. Moreover, the information within squares with dashed lines in the figures indicates information associated in the mediation server 100. Next, in S16, the mediation server 100 supplies the generated PIN code CD to the mobile terminal 50.

In a case where the PIN code CD is obtained from the mediation server 100 via the Wi-Fi I/F 60 or the cellular I/F 62 (i.e., by using the APNW or the cellular NW), in S18, the CPU 72 of the mobile terminal 50 displays the obtained PIN code CD on the display unit 54. Due to this, the user can know the PIN code CD, and can input the PIN code CD to the MFP 10.

In S20, the CPU 32 of the MFP 10 receives a registering instruction from the user. The registering instruction of S20 includes an operation for selecting a button indicating registration of MFP information to the mediation server 100, and an operation for inputting the PIN code CD.

In a case where the registering instruction of S20 is received, in S22, the CPU 32 of the MFP 10 determines whether a wireless connection between the MFP 10 and the AP 4 is currently established, i.e., whether the MFP 10 is currently joined to the APNW. Specifically, in a case where the AP information AI has been stored in the wireless information storing area 40 in the memory 34, the CPU 32 determines that a wireless connection between the MFP 10 and the AP 4 is currently established (YES in S22), and proceeds to S24 and, in a case where the AP information AI has not been stored, determines that a wireless connection between the MFP 10 and the AP 4 is not currently established (NO in S22), and proceeds to S40.

In S24, the CPU 32 of the MFP 10 causes the display unit 14 to display an inquiry screen for inquiring the user of whether the AP information AI is to be supplied to the mediation server 100. Next, in S26, the CPU 32 determines whether supplying the AP information AI to the mediation server 100 has been selected by the user in the inquiry screen. The CPU 32 determines that the supplying of the AP information AI to the mediation server 100 has been selected in a case where an OK button in the inquiry screen is selected by the user (YES in S26), and proceeds to S30, and determines that it has been selected that the AP information AI is not to be supplied to the mediation server 100 in a case where an NG button in the inquiry screen is selected by the user (NO in S26), and proceeds to S40.

In S30, the CPU 32 of the MFP 10 obtains the MFP device name DN, the AP information AI, the print capability information PI, and the scan capability information S1 from the memory 34, and then supplies the registering request to the mediation server 100. The registering request of S30 includes the PIN code CD that was input in S20, and MFP information MI1 including the information DN, AI, PI, SI obtained from the memory 34, and is a command for requesting the mediation server 100 for registration of the MFP information MI1. For example, in a case where the MFP 10 is joined to the APNW, and the AP 4 is functioning as a router, the CPU 32 supplies the registering request to the mediation server 100 via the Wi-Fi I/F 20 by using the APNW (i.e., via the AP 4). Further, e.g., in a case where the MFP 10 is joined to the wired NW, and a router is provided in the wired NW, the CPU 32 supplies the registering request to the mediation server 100 via the wired I/F 22 by using the wired NW.

In a case where the registering request of S30 is obtained from the MFP 10, in S32, the mediation server 100 determines whether the PIN code CD in the registering request has been registered and, in a case where it is determined that the PIN code CD has been registered, stores (i.e., registers) the MFP information MI1 in the registering request in association with the PIN code CD. Due to this, in the mediation server 100, the account information AC, the PIN code CD and the MFP information MI1 are associated with one another.

Next, in S34, an XMPP (eXtensible Messaging and Presence Protocol) connection, which is a so-called constant connection, is established between the MFP 10 and the mediation server 100. For example, in a case where the MFP 10 supplies the registering request of S30 to the mediation server 100 by using the APNW, the CPU 32 of the MFP 10 establishes an XMPP connection with the mediation server 100 by using the APNW (i.e., via the AP 4). Further, e.g., in a case where the MFP 10 supplies the registering request of S30 to the mediation server 100 by using the wired NW, the CPU 32 establishes an XMPP connection with the mediation server 100 by using the wired NW. In a situation where the XMPP connection has been established, a command (e.g., a print performing instruction of S142 of FIG. 4, etc.) can be supplied to the MFP 10 in a local area network from the mediation server 100 on the Internet 6. When S34 ends, the registering process of FIG. 2 ends.

On the other hand, in S40, the CPU 32 of the MFP 10 obtains the MFP device name DN, the G/O information GI, the print capability information PI, and the scan capability information S1 from the memory 34, and then supplies the registering request to the mediation server 100. The registering request of S40 includes the PIN code CD that was input in S20, and MFP information MI2 including the information DN, GI, PI, SI obtained from the memory 34, and is a command for requesting the mediation server 100 for registration of the MFP information MI2. As with S30, the CPU 32 supplies the registering request to the mediation server 100 via the Wi-Fi I/F 20 or the wired I/F 22. In a case where the user selects in the inquiry screen of S24 that the AP information AI is not to be supplied to the mediation server 100 (NO in S26), in S40 the AP information AI is not supplied to the mediation server 100. Thus, it is possible to prevent a reduction in a security of the APNW.

In a case where the registering request of S40 is obtained from the MFP 10, in S42, as with S32, the mediation server 100 stores (i.e., registers) the MFP information MI2 in the registering request in association with the PIN code CD. Due to this, in the mediation server 100, the account information AC, the PIN code CD and the MFP information MI2 are associated with one another. Next, in S44, as in S34, an XMPP connection between the MFP 10 and the mediation server 100 is established. When S44 ends, the registering process of FIG. 2 ends.

As described above, in the registering process, all of the print capability information PI, the scan capability information S1 and NW information (i.e., the AP information AI or the G/O information GI) are registered together in the mediation server 100. Consequently, registration of the respective information in the mediation server 100 can be performed more easily with the MFP 10 than with a configuration in which the respective information is registered separately in the mediation server 100. Further, management of the respective information (i.e., management of the MFP 10) can be performed more easily with the mediation server 100 than in a configuration in which the respective information is managed separately.

Moreover, in a case where the APNW to which the MFP 10 belongs is changed (i.e., a case where the AP information AI is changed), or in a case where the G/O information GI of the MFP 10 is changed, the MFP 10 may register new MFP information including the changed information in the mediation server 100 instead of the MFP information in the mediation server 100.

Figure 3:
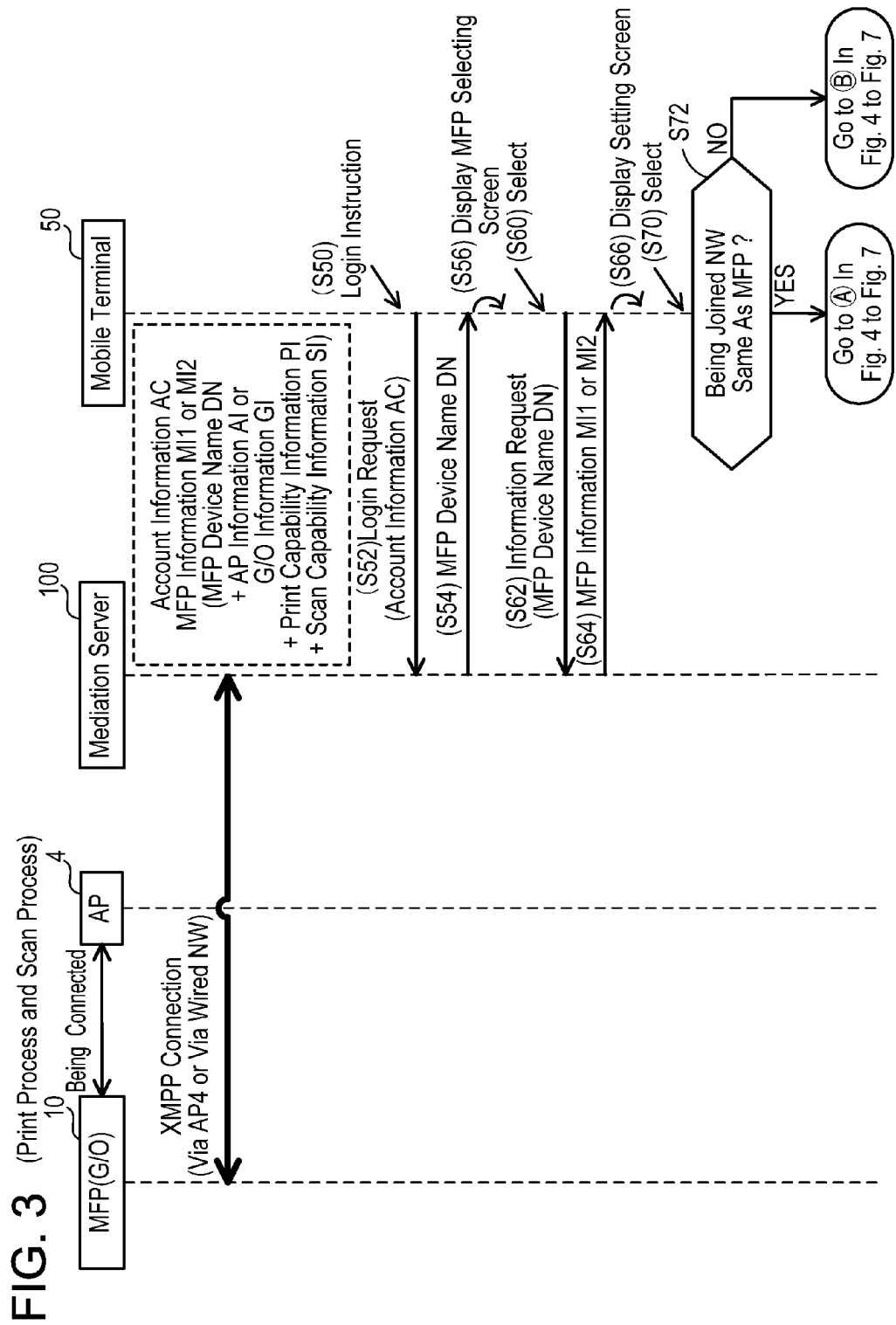
FIG. 3 shows a sequence chart for a print process and scan process.

(Print Process and Scan Process; FIG. 3)

Next, contents of a print process and a scan process will be described with reference to FIG. 3. In a state of FIG. 3, the MFP 10 has established a wireless connection with the AP 4 (i.e., is joined to the APNW). The mediation server 100 is storing the account information AC and the MFP information MI1 or MI2 in association with one another (see S32 or S42 of FIG. 2). Moreover, in FIG. 2, the mediation server 100 is further storing the PIN code CD, but since the PIN code CD is not used from FIG. 3 onward, the PIN code CD is not shown. Further, the XMPP connection has been established between the MFP 10 and the mediation server 100 via the APNW or the wired NW (see S34 or S44 of FIG. 2).

In S50, the CPU 72 of the mobile terminal 50 receives a login instruction from the user. The login instruction includes an operation for starting the server application 78, and an operation for selecting a button indicating login to the mediation server 100. S52, S56, S60, S64, S66, and S72, which are subsequent to S50, are performed in accordance with the server application 78.

In a case where the login instruction is received, the CPU 72 of the mobile terminal 50 obtains the account information AC from the memory 74 and, in S52, supplies a login request including the obtained account information AC to the mediation server 100. The login request is a command for requesting the mediation server 100 for login based on the account information AC. In S52, as in S12 of FIG. 2, the CPU 72 supplies the login request to the mediation server 100 via the Wi-Fi I/F 60 or the cellular I/F 62 (i.e., by using the APNW or the cellular NW).

In a case where the login request is obtained from the mobile terminal 50, the mediation server 100 performs authentication of the account information AC in the login request and, in a case where the authentication succeeds, establishes a login state with the mobile terminal 50. Then, in S54, the mediation server 100 obtains the MFP device name DN associated with the account information AC, and supplies the obtained MFP device name DN to the mobile terminal 50.

In a case where the MFP device name DN is obtained from the mediation server 100 via the Wi-Fi I/F 60 or the cellular I/F 62, in S56, the CPU 72 of the mobile terminal 50 causes the display unit 54 to display an MFP selecting screen including the obtained MFP device name DN. Due to this, the user can know the name of the MFP 10 which can be caused to perform the print function or scan function by the mobile terminal 50. Moreover, in a case where information of an MFP different from the MFP 10 is further associated with the account information AC in the mediation server 100, a device name of that different MFP is also supplied to the mobile terminal 50 from the mediation server 100. In this case, the MFP selecting screen of S56 includes not only the device name DN of the MFP 10, but also the device name of the different MFP.

Next, in S60, the CPU 72 of the mobile terminal 50 receives selection of the MFP device name DN from the user in the MFP selecting screen. Then in S62, the CPU 72 supplies an information request including the selected MFP device name DN to the mediation server 100 via the Wi-Fi I/F 60 or the cellular I/F 62. The information request is a command for requesting the mediation server 100 to supply MFP information.

In a case where the information request is obtained from the mobile terminal 50, the mediation server 100 obtains the MFP information MI1 or MI2 associated with the MFP device name DN in the information request and, in S64, supplies the obtained MFP information MI1 or MI2 to the mobile terminal 50.

In a case where the MFP information MI1 or MI2 is obtained from the mediation server 100 via the Wi-Fi I/F 60 or the cellular I/F 62, in S66, the CPU 72 of the mobile terminal 50 causes the display unit 54 to display a setting screen. The setting screen includes a button for selecting print function or scan function, and a setting area for setting a print condition or scan condition. In a case where the print function is selected, the setting area is an area for selecting target data representing a print target image from among a plurality of data in the memory 74, and for selecting a print condition (e.g., number of print colors "color print", printing paper size "A4", print resolution "600 dpi") from among the print capability information PI included in the MFP information MI1 or MI2. Further, in a case where the scan function is selected, the setting area is an area for selecting a scan condition (e.g., output data format "PDF", number of scan colors "color scan", read document size "A4", scan resolution "600 dpi") from among the scan capability information S1 included in the MFP information MI1 or MI2.

In S70, the CPU 72 of the mobile terminal 50 receives selection of print function or scan function from the user, and selection of print condition or scan condition in the setting screen. Thus, the CPU 72 determines that operation of the print instruction or scan instruction has been performed by the user. Next, in S72, the CPU 72 determines whether the mobile terminal 50 is currently joined to the same NW as the MFP 10. Specifically, in a case where the MFP information MI1 is obtained in S64, the CPU 72 determines whether the AP information AI that matches the AP information AI in the MFP information MI1 has been stored in the memory 74. In a case where the AP information AI has been stored in the memory 74, the CPU 72 determines that the mobile terminal 50 is currently joined to the same NW (i.e., the APNW) as the MFP 10 (YES in S72), and proceeds to "A" of FIG. 4 or FIG. 6. On the other hand, in a case where the AP information AI has not been stored in the memory 74, the CPU 72 determines that the mobile terminal 50 is not currently joined to the same NW as the MFP 10 (NO in S72), and proceeds to "B" of FIG. 4 or FIG. 6. Further, in a case where the MFP information MI2 is obtained in S64, the CPU 72 determines whether the G/O information GI that matches the G/O information GI in the MFP information MI2 has been stored in the memory 74. In a case where the G/O information GI has been stored in the memory 74, the CPU 72 determines that the mobile terminal 50 is currently joined to the same NW as the MFP 10 (i.e., the WFDNW) (YES in S72), and proceeds to "A" of FIG. 5 or FIG. 7. On the other hand, in a case where the G/O information GI has not been stored in the memory 74, the CPU 72 determines that the mobile terminal 50 is not currently joined to the same NW as the MFP 10 (NO in S72), and proceeds to "B" of FIG. 5 or FIG. 7.

Figure 4:
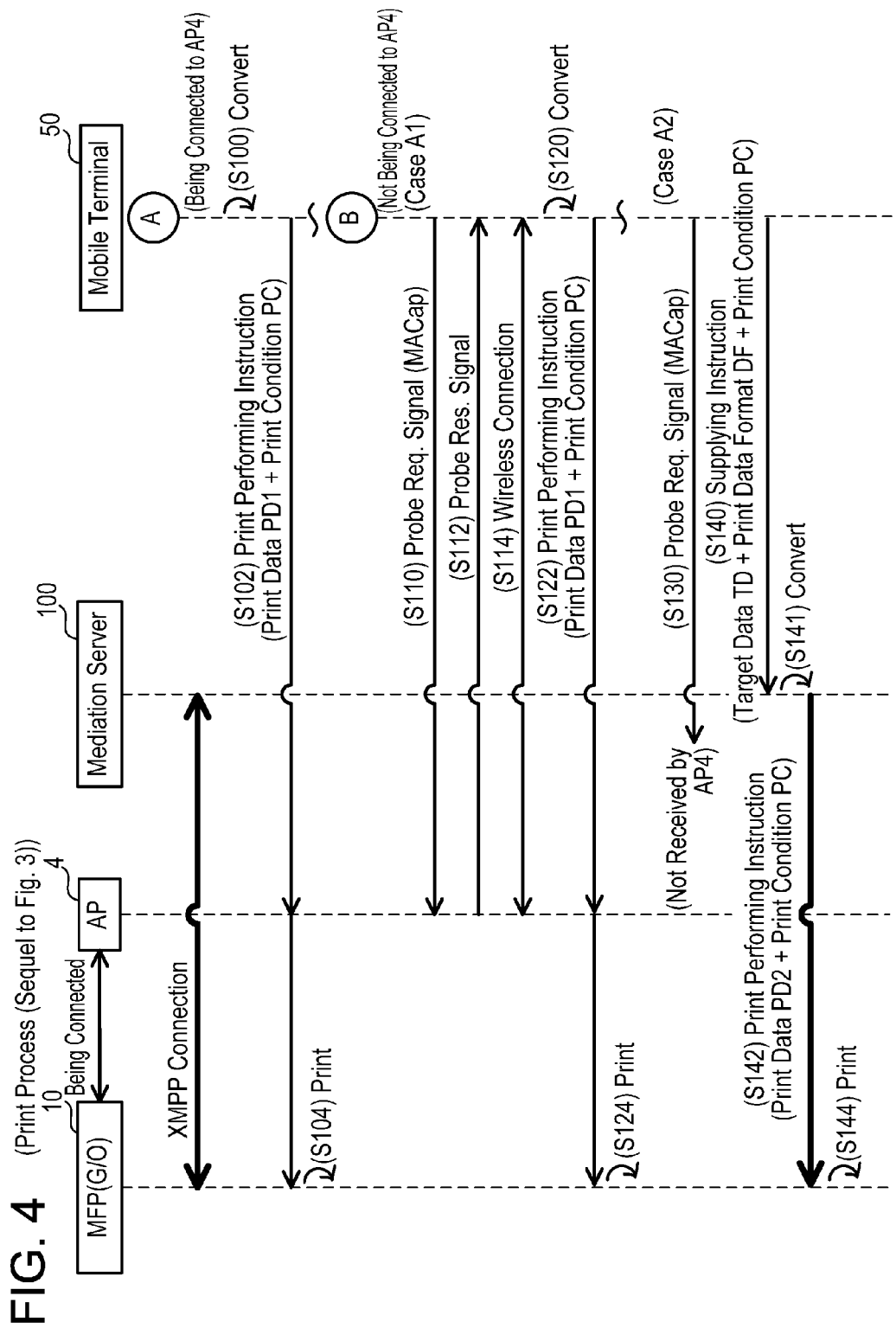
FIG. 4 shows a sequence chart for a print process which is sequel to the FIG. 3.

(Print Process; FIG. 4)

Next, the contents of a print process performed in a case where the print function and print condition are selected in S70 of FIG. 3 will be described with reference to FIG. 4. In particular, the print process of FIG. 4 shows a case in which the MFP information MI1 including the AP information AI is supplied to the mobile terminal 50 from the mediation server 100 in S64 of FIG. 3. The processes of S100, S102, S120, S122 of the mobile terminal 50 are performed in accordance with the MFP application 80, and the other processes of the mobile terminal 50 are performed in accordance with the server application 78.

In a case where the AP information AI has been stored in the memory 74 of the mobile terminal 50 (YES in S72 of FIG. 3), i.e., in a case where the mobile terminal 50 is currently establishing wireless connection with the AP 4 and is joined to the same APNW as the MFP 10, S100 is performed in the mobile terminal 50, as shown in "A". In S100, the CPU 72 of the mobile terminal 50 converts the target data selected in S70 of FIG. 3, generating print data PD1. The print data PD1 has a print data format included in the print capability information PI of the MFP information MI1 obtained in S64 of FIG. 3, i.e., has a print data format which can be interpreted by the print engine 16 of the MFP 10. Further, the print data PD1 is data conforming to a print condition PC selected in S70 of FIG. 3 (i.e., selected number of print colors, selected printing paper size, selected print resolution).

Next, in S102, the CPU 72 of the mobile terminal 50 supplies a print performing instruction to the MFP 10 via the Wi-Fi I/F 60 by using the APNW (i.e., via the AP 4). The print performing instruction of S102 includes the generated print data PD1 and the print condition PC, and is a command for causing the MFP 10 to perform a print function for printing an image represented by the print data PD1 (i.e., an image represented by the target data).

In a case where the print performing instruction of S102 is obtained from the mobile terminal 50 via the Wi-Fi I/F 20 by using the APNW (i.e., via the AP 4), in S104 the CPU 32 of the MFP 10 causes the print engine 16 to perform the print function. Specifically, the CPU 32 notifies the print engine 16 of the printing paper size (e.g., "A4") included in the print condition in the print performing instruction and, further, supplies the print data PD1 in the print performing instruction to the print engine 16. Due to this, the print engine 16 prints an image represented by the print data PD1 on a printing paper having the printing paper size notified from the CPU 32.

On the other hand, in a case where the AP information AI has not been stored in the memory 74 of the mobile terminal 50 (NO in S72 of FIG. 3), i.e., in a case where the mobile terminal 50 is not currently establishing wireless connection with the AP 4 and is not joined to the same APNW as the MFP 10, case A1 or case A2 is realized, as shown in "B".

In S110 of case A1, the CPU 72 of the mobile terminal 50 sends a Probe Request signal including the MACap in the AP information AI via the Wi-Fi I/F 60. The Probe Request signal is a signal for searching for an apparatus (i.e., the AP 4 in the present case) that has the MAC address in the Probe Request signal. In case A1, since the AP 4 is present in a vicinity of the mobile terminal 50 (e.g., within 100 m), the AP 4 receives the Probe Request signal from the mobile terminal 50 and, in S112, sends a Probe Response signal, which is a response signal to the Probe Request signal, to the mobile terminal 50. Below, Request, Response will be described as "Req." and "Res.", respectively.

In a case where the Probe Res. signal is received from the AP 4 via the Wi-Fi I/F 60 i.e., in a case where the AP 4 has been found as a result of searching for the AP 4, in S114 the CPU 72 of the mobile terminal 50 establishes a wireless connection with the AP 4 via the Wi-Fi I/F 60. Due to this, a state of the MFP 10 and the mobile terminal 50 becomes a state of being joined the same APNW. Specifically, the CPU 72 performs, with the AP 4, sending of an Authentication Req. signal, receiving of an Authentication Res. signal, sending of an Association Req. signal, receiving of an Association Res. signal, communication of a 4-Way Handshake, etc. These communications include communication of a signal including the SSID "aaa" in the AP information AI, and communication of a signal including the password PSa in the AP information AI. That is, the CPU 72 establishes a wireless connection with the AP 4 by using the AP information AI. S120 to S124, which are performed subsequently, are the same as S100 to S104.

In case A2, the Probe Req. signal including the MACap is sent from the mobile terminal 50 (S130) but, since the AP 4 is not present in the vicinity of the mobile terminal 50, the AP 4 cannot receive the Probe Req. signal from the mobile terminal 50. Consequently, the CPU 72 of the mobile terminal 50 does not receive the Probe Res. signal from the AP 4 (i.e., cannot find the AP 4), and cannot establish a wireless connection with the AP 4 (i.e., cannot join the APNW). In this case, in S140, the CPU 72 supplies a supplying instruction to the mediation server 100 via the cellular I/F 62 (i.e., by using the cellular NW). The supplying instruction of S140 includes the target data TD selected in S70 of FIG. 3, print data format DF included in the print capability information PI of the MFP information MI1 obtained in S64 of FIG. 3, and the print condition PC selected in S70 of FIG. 3. The supplying instruction of S140 is a command for causing the mediation server 100 to convert the target data TD, and supply a print performing instruction including print data generated by the conversion to the MFP 10.

In a case where the supplying instruction is obtained from the mobile terminal 50, in S141 the mediation server 100 converts the target data TD in the supplying instruction, generating print data PD2. The print data PD2 has the print data format DF in the supplying instruction, i.e., has the print data format DF which can be interpreted by the print engine 16 of the MFP 10. Further, the print data PD2 is data conforming to the print condition PC in the supplying instruction (i.e., selected number of print colors, selected printing paper size, selected print resolution).

Next, in S142, the mediation server 100 supplies the print performing instruction to the MFP 10 by using the XMPP connection. Since the XMPP connection is used, the print performing instruction is appropriately supplied to the MFP 10 in the local area network from the mediation server 100 on the Internet 6. The print performing instruction of S142 includes the generated print data PD2 and the print condition PC in the supplying instruction, and is a command for causing the MFP 10 to perform a print function for printing an image represented by the print data PD2 (i.e., an image represented by the target data TD).

In a case where the print performing instruction of S142 is obtained from the mediation server 100 by using the XMPP connection, in S144 the CPU 32 of the MFP 10 causes the print engine 16 to perform the print function. S144 is the same as S104.

Figure 5:
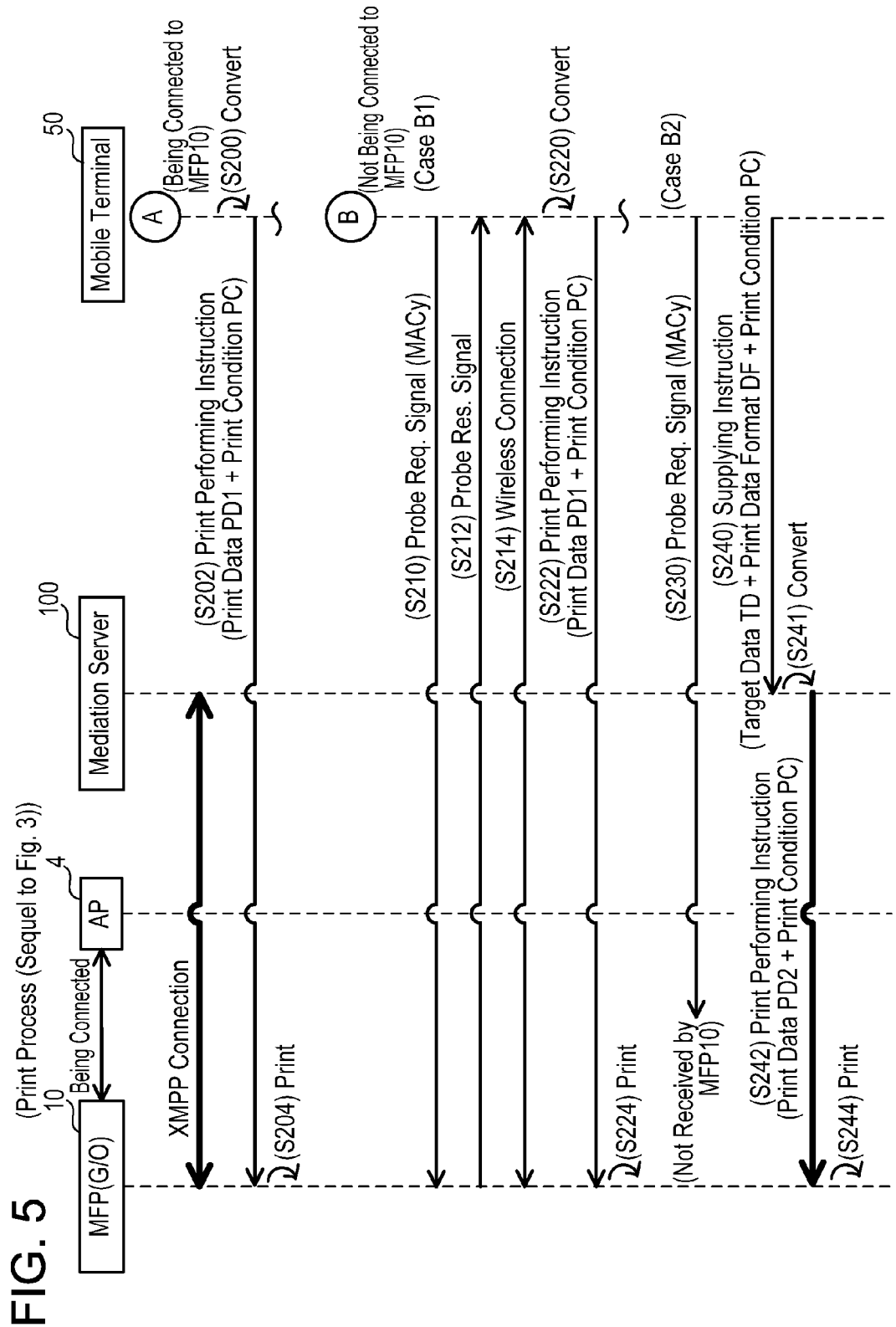
FIG. 5 shows a sequence chart for a print process which is sequel to the FIG. 3.

(Print Process; FIG. 5)

Next, the contents of the print process performed in a case where the print function and print condition are selected in S70 of FIG. 3 will be described with reference to FIG. 5. In particular, the print process of FIG. 5 shows a case in which the MFP information MI2 including the G/O information GI is supplied from the mediation server 100 to the mobile terminal 50 in S64 of FIG. 3. The processes of S200, S202, S220, S222 of the mobile terminal 50 are performed in accordance with the MFP application 80, and the other processes of the mobile terminal 50 are performed in accordance with the server application 78.

In a case where the G/O information GI has been stored in the memory 74 of the mobile terminal 50 (YES in S72 of FIG. 3), i.e., in a case where the mobile terminal 50 is currently establishing wireless connection with the MFP 10 and is joined to the same WFDNW as the MFP 10, S200 is performed in the mobile terminal 50, as shown in "A". S200 is the same as S100 of FIG. 4.

Next, in S202, the CPU 72 of the mobile terminal 50 supplies the print performing instruction to the MFP 10 via the Wi-Fi I/F 60 by using the WFDNW (i.e., not via the AP 4). The print performing instruction of S202 is the same as the print performing instruction of S102 of FIG. 4.

In a case where the print performing instruction is obtained from the mobile terminal 50 via the Wi-Fi I/F 20 by using the WFDNW (i.e., not via the AP 4), in S204 the CPU 32 of the MFP 10 causes the print engine 16 to perform the print function. S204 is the same as S104 of FIG. 4.

On the other hand, in a case where the G/O information GI has not been stored in the memory 74 of the mobile terminal 50 (NO in S72 of FIG. 3), i.e., the mobile terminal 50 is not currently establishing wireless connection with the MFP 10 and is not joined to the same WFDNW as the MFP 10, case B1 or case B2 is realized, as shown in "B".

In S210 of case B1, the CPU 72 of the mobile terminal 50 sends a Probe Req. signal including the MACy in the G/O information GI via the Wi-Fi I/F 60. In case B1, since the MFP 10 is present in the vicinity of the mobile terminal 50, the MFP 10 receives the Probe Req. signal from the mobile terminal 50 and, in S212, sends the Probe Res. signal to the mobile terminal 50.

In a case where the Probe Res. signal is received from the MFP 10 via the Wi-Fi I/F 60, i.e., in a case where the MFP 10 has been found as a result of searching for the MFP 10 which is operating as G/O, in S214, the CPU 72 of the mobile terminal 50 establishes a wireless connection with the MFP 10 via the Wi-Fi I/F 60. Due to this, a state of the MFP 10 and the mobile terminal 50 becomes a state of being joined the same WFDNW. Specifically, the CPU 72 performs the communication of signals with the MFP 10, as in S114 of FIG. 3. These communications include communication of a signal including the SSID "bbb" in the G/O information GI, and communication of a signal including the password PSb in the G/O information GI. That is, the CPU 72 establishes a wireless connection with the MFP 10 by using the G/O information GI. S220 to S224, which are performed subsequently, are the same as S200 to S204.

In case B2, the Probe Req. signal including the MACy is sent from the mobile terminal 50 (S230) but, since the MFP 10 is not present in the vicinity of the mobile terminal 50, the MFP 10 cannot receive the Probe Req. signal from the mobile terminal 50. Consequently, the CPU 72 of the mobile terminal 50 does not receive the Probe Res. signal from the MFP 10 (i.e., cannot find the MFP 10), and cannot establish a wireless connection with the MFP 10 (i.e., cannot join the WFDNW). S240 to S244, which are performed subsequently, are the same as S140 to S144 of FIG. 4.

(Effect of Print Process)

As described above, the MFP 10 registers the MFP information MI1 or MI2 including the AP information AI or the G/O information GI in the mediation server 100 (S30, S32, S40, S42 of FIG. 2). Consequently, the mobile terminal 50 can join the APNW or WFDNW (case A1 of FIG. 4, case B1 of FIG. 5) by using the AP information AI or the G/O information GI registered in the mediation server 100. In this case, since the MFP 10 and the mobile terminal 50 belong to the same NW, the mobile terminal 50 can supply the print performing instruction to the MFP 10 not via the mediation server 100, but via the APNW or the WFDNW (S122 of FIG. 4, S222 of FIG. 5). In other words, the MFP 10 can obtain the print performing instruction from the mobile terminal 50 not via the mediation server 100, but via the APNW or the WFDNW. Since the mobile terminal 50 supplies the print performing instruction to the MFP 10 not via the mediation server 100, the mobile terminal 50 can rapidly supply the print performing instruction to the MFP 10. In other words, since the MFP 10 obtains the print performing instruction from the mobile terminal 50 not via the mediation server 100, the MFP 10 can rapidly obtain the print performing instruction. As a result, the MFP 10 can rapidly perform the print function in response to the print performing instruction obtained from the mobile terminal 50. Further, even in a situation in which the mobile terminal 50 is not joined to the APNW or the WFDNW (case A2 of FIG. 4, case B2 of FIG. 5), the MFP 10 can obtain the print performing instruction from the mediation server 100 (S142 of FIG. 4, S242 of FIG. 5), and consequently can appropriately perform the print function in response to the print performing instruction obtained from the mediation server 100.

Further, in a case where the mobile terminal 50 is currently joined to the same NW as the MFP 10 (YES in S72 of FIG. 3), as shown in "A" of FIG. 4 and FIG. 5, the print performing instruction is supplied to the MFP 10 (S102 of FIG. 4, S202 of FIG. 5) without performing the processes for establishing a wireless connection with the AP 4 or the MFP 10 (i.e., S110 to S114 of FIG. 4, S210 to S214 of FIG. 5). Since the mobile terminal 50 does not need to perform the processes for establishing a wireless connection with the AP 4 or the MFP 10, the processing load of the mobile terminal 50 can be reduced.

Figure 6:
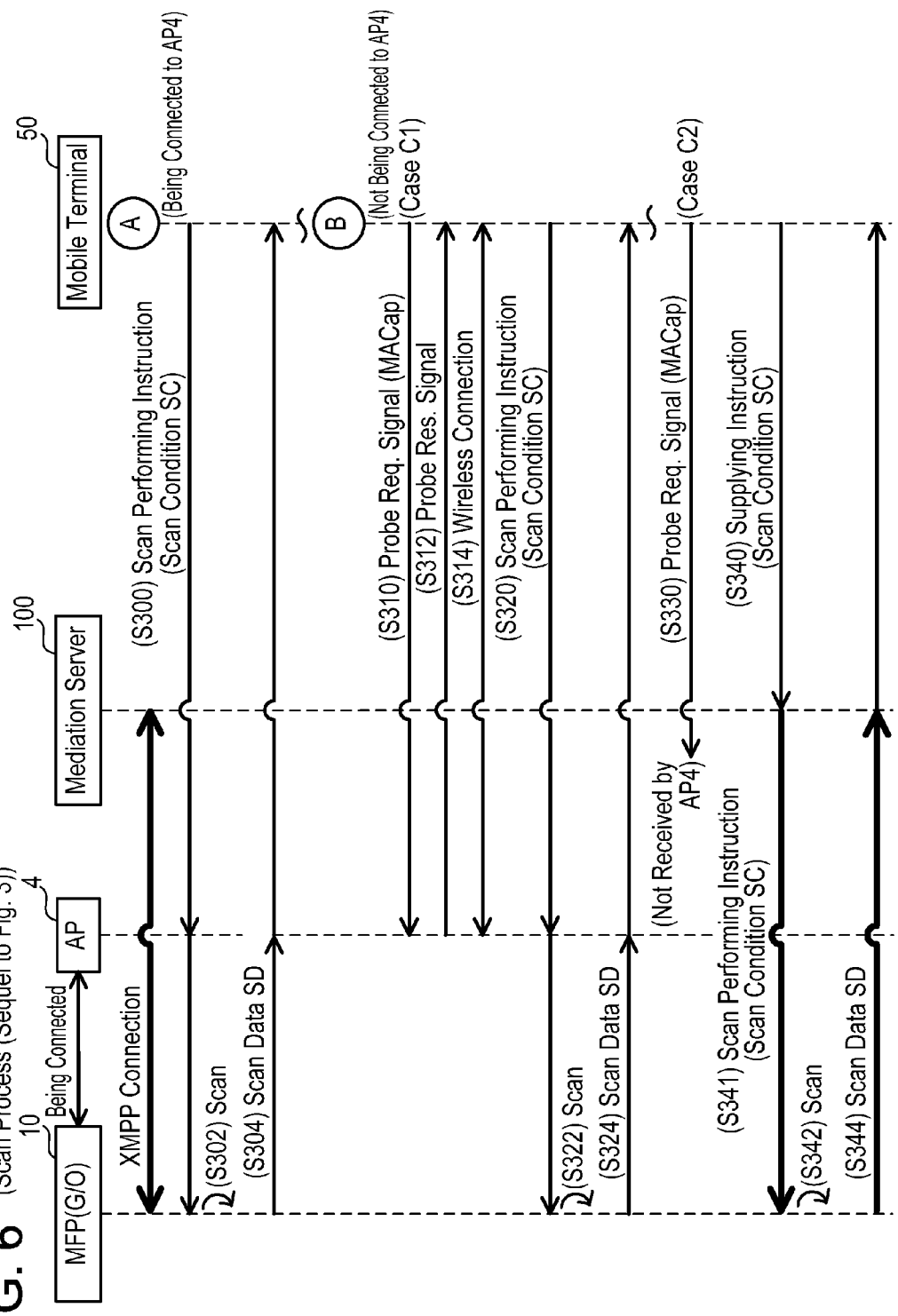
FIG. 6 shows a sequence chart for a scan process which is sequel to the FIG. 3.

(Scan Process; FIG. 6)

Next, the contents of the scan process performed in a case where the scan function and scan condition are selected in S70 of FIG. 3 will be described with reference to FIG. 6. In particular, the scan process of FIG. 6 shows a case in which the MFP information MI1 including the AP information AI is supplied from the mediation server 100 to the mobile terminal 50 in S64 of FIG. 3. Moreover, in the scan process, all the processes of the mobile terminal 50 are performed in accordance with the server application 78. However, in a modification, the processes of S300 and S320 of the mobile terminal 50 (further, S400 and S420 of FIG. 7) may be performed in accordance with the MFP application 80.

In a case where the AP information AI has been stored in the memory 74 of the mobile terminal 50 (YES in S72 of FIG. 3), i.e., the mobile terminal 50 is currently establishing wireless connection with the AP 4 and is joined to the same APNW as the MFP 10, as shown in "A", S300 is performed in the mobile terminal 50. In S300, the CPU 72 of the mobile terminal 50 supplies a scan performing instruction to the MFP 10 via the Wi-Fi I/F 60 by using the APNW (i.e., via the AP 4). The scan performing instruction of S300 includes the scan condition SC selected in S70 of FIG. 3 (i.e., selected output data format, selected number of scan colors, selected read document size, selected scan resolution), and is a command for causing the MFP 10 to perform the scan function.

In a case where the scan performing instruction of S300 is obtained from the mobile terminal 50 via the Wi-Fi I/F 20 by using the APNW (i.e., via the AP 4), in S302 the CPU 32 of the MFP 10 causes the scan engine 18 to perform the scan function. Specifically, the CPU 32 notifies the scan engine 18 of the number of scan colors, read document size, and scan resolution included in the scan condition SC in the scan performing instruction. Due to this, the scan engine 18 performs a scan of a document in accordance with the number of scan colors, etc. notified from the CPU 32, and supplies a scan result to the controller 30. By using the scan result, the CPU 32 generates scan data SD having the output data format included in the scan condition SC in the scan performing instruction.

Next, in S304, the CPU 32 of the MFP 10 supplies the generated scan data SD to the mobile terminal 50 via the Wi-Fi I/F 20 by using the APNW (i.e., via the AP 4). Thus, the scan data SD can be stored in the mobile terminal 50.

On the other hand, in a case where the AP information AI has not been stored in the memory 74 of the mobile terminal 50 (NO in S72 of FIG. 3), i.e., the mobile terminal 50 is not currently establishing wireless connection with the AP 4 and is not joined to the same APNW as the MFP 10, case C1 or case C2 is realized, as shown in "B".

S310 to S314 of case C1 are the same as S110 to S114 of case A1 of FIG. 4. Further, S320 to S324, which are performed subsequently, are the same as S300 to S304.

S330 of case C2 is the same as S130 of case A2 of FIG. 4. In S340, the CPU 72 supplies the supplying instruction to the mediation server 100 via the cellular I/F 62 (i.e., by using the cellular NW). The supplying instruction of S340 includes the scan condition SC selected in S70 of FIG. 3. The supplying instruction of S340 is a command for causing the mediation server 100 to supply the scan performing instruction to the MFP 10.

In a case where the supplying instruction is obtained from the mobile terminal 50, in S341 the mediation server 100 supplies the scan performing instruction to the MFP 10 by using the XMPP connection. Since the XMPP connection is used, the scan performing instruction is appropriately supplied to the MFP 10 in the local area network from the mediation server 100 on the Internet 6. The scan performing instruction of S342 includes the scan condition SC in the supplying instruction, and is a command for causing the MFP 10 to perform the scan function.

In a case where the scan performing instruction of S341 is obtained from the mediation server 100 by using the XMPP connection, in S342 the CPU 32 of the MFP 10 causes the scan engine 18 to perform the scan function. S342 is the same as S302. Then, the CPU 32 supplies the scan data SD to the mediation server 100 by using the XMPP connection.

In a case where the scan data SD is obtained from the MFP 10, the mediation server 100 supplies the scan data SD to the mobile terminal 50 by using the cellular NW. Due to this, the scan data SD can be stored in the mobile terminal 50.

Figure 7:
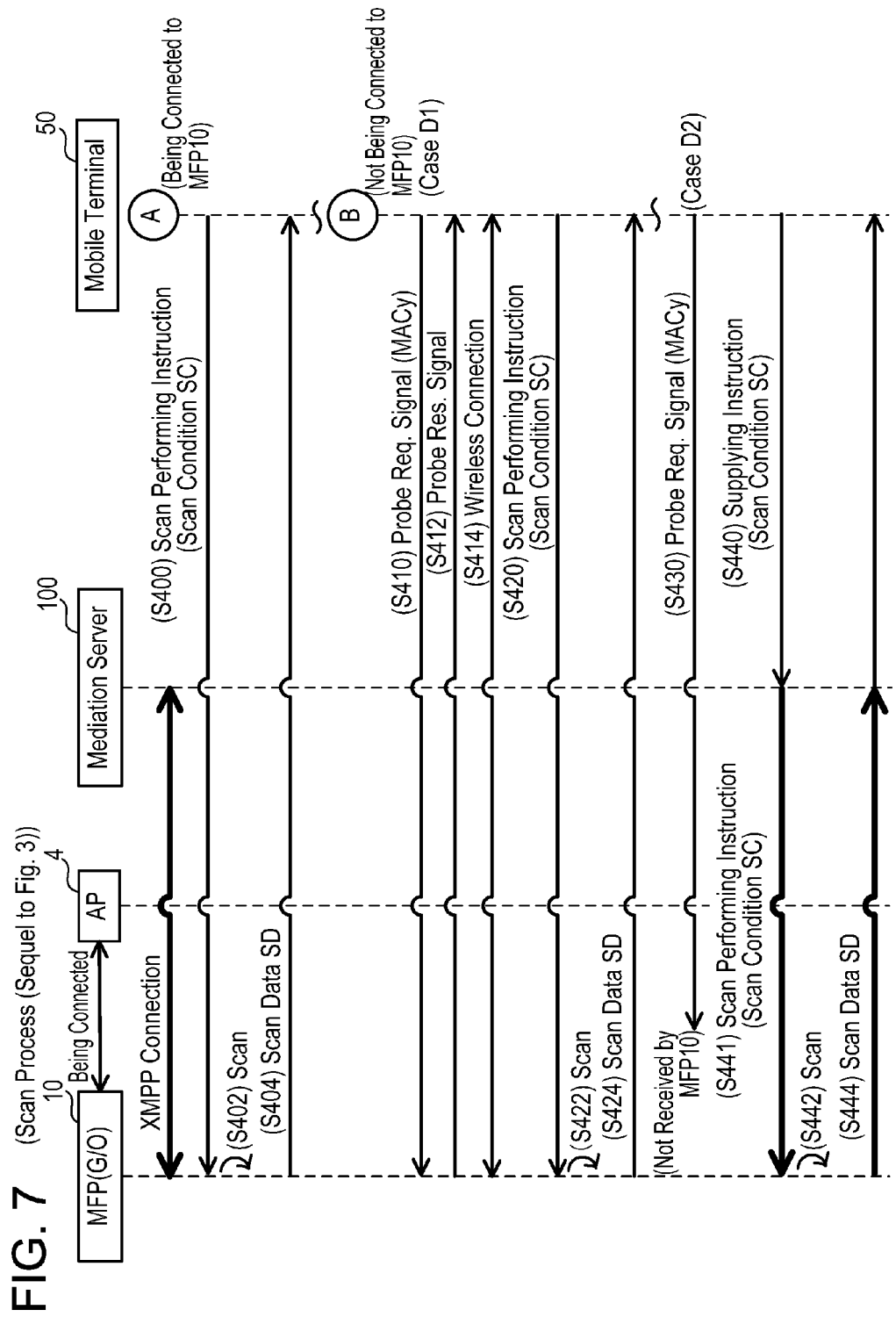
FIG. 7 shows a sequence chart for a scan process which is sequel to the FIG. 3.

(Scan Process; FIG. 7)

Next, the contents of a scan process performed in a case where the scan function and scan condition are selected in S70 of FIG. 3 will be described with reference to FIG. 7. In particular, the scan process of FIG. 7 shows a case in which the MFP information MI2 including the G/O information GI is supplied from the mediation server 100 to the mobile terminal 50 in S64 of FIG. 3.

In a case where the G/O information GI has been stored in the memory 74 of the mobile terminal 50 (YES in S72 of FIG. 3), i.e., the mobile terminal 50 is currently establishing wireless connection with the MFP 10 and is joined to the same WFDNW as the MFP 10, S400 is performed in the mobile terminal 50, as shown in "A". In S400, the CPU 72 of the mobile terminal 50 supplies the scan performing instruction to the MFP 10 via the Wi-Fi I/F 60 by using the WFDNW (i.e., not via the AP 4). The scan performing instruction of S400 is the same as the scan performing instruction of S300 of FIG. 6.

In a case where the scan performing instruction is obtained from the mobile terminal 50 via the Wi-Fi I/F 20 by using the WFDNW (i.e., not via the AP 4), in S402 the CPU 32 of the MFP 10 causes the scan engine 18 to perform the scan function and, in S404, supplies the scan data SD to the mobile terminal 50. S402 and S404 are the same as S302 and S304 of FIG. 6.

On the other hand, in a case where the G/O information GI has not been stored in the memory 74 of the mobile terminal 50 (NO in S72 of FIG. 3), i.e., the mobile terminal 50 is not currently establishing wireless connection with the MFP 10 and is not joined to the same WFDNW as the MFP 10, case D1 or case D2 is realized, as shown in "B".

S410 to S414 of case D1 are the same as S210 to S214 of case B1 of FIG. 5. Further, S420 to S424, which are performed subsequently, are the same as S400 to S404.

S430 of case D2 is the same as S230 of case B2 of FIG. 5. S440 to S444, which are performed subsequently, are the same as S340 to S344 of FIG. 6.

(Effect of Scan Process)

As described above, the MFP 10 registers the MFP information MI1 or MI2 including the AP information AI or the G/O information GI in the mediation server 100 (S30, S32, S40, S42 of FIG. 2). Consequently, the mobile terminal 50 can join the APNW or WFDPNW (case C1 of FIG. 6, case D1 of FIG. 7) by using the AP information AI or the G/O information GI registered in the mediation server 100. In this case, since the MFP 10 and the mobile terminal 50 belong to the same NW, the mobile terminal 50 can supply the scan performing instruction to the MFP 10 not via the mediation server 100, but via the APNW or the WFDNW (S320 of FIG. 6, S420 of FIG. 7). Since the mobile terminal 50 supplies the scan performing instruction to the MFP 10 not via the mediation server 100, the mobile terminal 50 can rapidly supply the scan performing instruction to the MFP 10. As a result, the MFP 10 can rapidly perform the scan function in response to the scan performing instruction obtained from the mobile terminal 50, and can rapidly supply the scan data SD to the mobile terminal 50. In particular, a situation is assumed in which the user sets a document on the MFP 10 and performs an operation related to a scan, on the mobile terminal 50, in the vicinity of the MFP 10. Since the distance between the MFP 10 and the mobile terminal 50 is short in this type of situation, the mobile terminal 50 is likely to be able to communicate with the MFP 10 or the AP 4. Consequently, the mobile terminal 50 can rapidly supply the scan performing instruction to the MFP 10 not via the mediation server 100. Further, even in a situation in which the mobile terminal 50 is not joined to the APNW or the WFDNW (case C2 of FIG. 6, case D2 of FIG. 7), the MFP 10 can obtain the scan performing instruction from the mediation server 100 (S341 of FIG. 6, S441 of FIG. 7), and consequently the MFP 10 can appropriately perform the scan function in response to the scan performing instruction obtained from the mediation server 100.

(Corresponding Relationships)

The MFP 10 and the mobile terminal 50 are examples of "function performing device" and "terminal device", respectively. The APNW, the WFDNW are examples of "first wireless network" and "second wireless network", respectively. In a case of FIG. 4 or FIG. 6, the APNW is an example of "wireless network". In a case of FIG. 5 or FIG. 7, the WFDNW is an example of "wireless network". The G/O is an example of "parent station". The MACap is an example of "access point information".

The print engine 16 is an example of "first function performing engine" and "function performing engine". In this case, the following correspondence relationship can be obtained. The print function is an example of "first function" and "specific function". The print capability information PI, the scan engine 18, and the scan capability information S1 are examples of "first condition information", "second function performing engine" and "second condition information", respectively. The print performing instruction is an example of "first performing instruction", "second performing instruction", "first function performing instruction", and "second function performing instruction". The scan performing instruction is an example of "third performing instruction" and "fourth performing instruction". The supplying instruction of S140 or S240 of FIG. 4 or FIG. 5 is an example of "first supplying instruction" and "supplying instruction". The supplying instruction of S340 or S440 of FIG. 6 or FIG. 7 is an example of "second supplying instruction". The print data PD1 and the print data PD2 of FIG. 4 or FIG. 5 are examples of "first print data", "second print data", respectively.

Further, the scan engine 18 is an example of "first function performing engine" and "function performing engine". In this case, the following correspondence relationship can be obtained. The scan function is an example of "first function" and "specific function". The scan capability information S1, the print engine 16, and the print capability information PI are examples of "first condition information", "second function performing engine" and "second condition information", respectively. The scan performing instruction is an example of "first performing instruction", "second performing instruction", "first function performing instruction", and "second function performing instruction". The print performing instruction is an example of "third performing instruction" and "fourth performing instruction". The supplying instruction of S340 or S440 of FIG. 6 or FIG. 7 is an example of "first supplying instruction" and "supplying instruction". The supplying instruction of S140 or S240 of FIG. 4 or FIG. 5 is an example of "second supplying instruction".

Second Embodiment

In the first embodiment described above, as shown in FIG. 2, in a case where the MFP 10 is joined to the APNW (YES in S22 of FIG. 2), the MFP 10 may register the MFP information MI1 including the AP information AI in the mediation server 100 (S30, S32). In contrast, in the present embodiment, the MFP 10 registers the MFP information MI2 including the G/O information GI in the mediation server 100 regardless of whether the MFP 10 is joined to the APNW.

Figure 8:
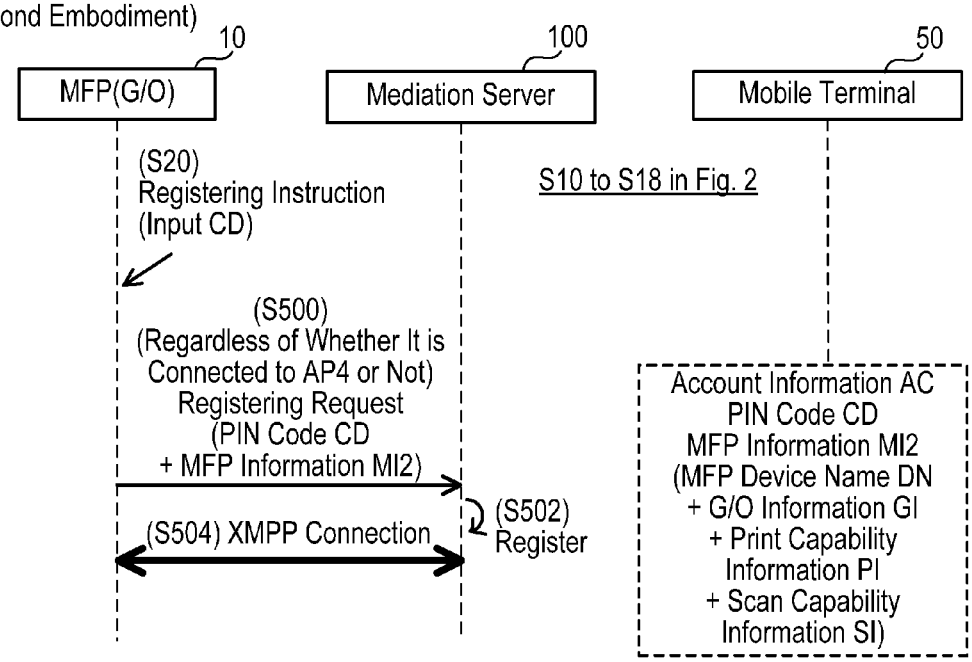
FIG. 8 shows a sequence chart for a second embodiment.

(Registering Process; FIG. 8)

In the present embodiment, the registering process of FIG. 8 is performed instead of the registering process of FIG. 2. In the registering process of FIG. 8 also, as in FIG. 2, S10 to S18 are performed. In a case where the registering instruction of S20 is received from the user, in S500, regardless of whether the MFP 10 is establishing a wireless connection with the AP 4, i.e., regardless of whether the MFP 10 is joined to the APNW, the CPU 32 of the MFP 10 supplies the MFP information MI2 including the G/O information GI to the mediation server 100, and registers the MFP information MI2 in the mediation server 100. S502 and S504 are the same as S42 and S44 of FIG. 2. The subsequent processes are the same as in FIG. 3, FIG. 5, and FIG. 7.

In the present embodiment, since the MFP 10 does not supply the AP information AI to the mediation server 100, it is possible to prevent a reduction in the security of the APNW. Further, e.g., an environment such as an office is assumed in which a manager of a network manages all the terminal devices belonging to the APNW. In this type of environment, it is conceivable that the manager permits an external terminal device, which is not a management target, to temporarily join the WFDNW. In the present embodiment, in this type of situation, it is possible for the external terminal device to cause the MFP 10 to rapidly perform a function.

Third Embodiment

In the present embodiment, as shown in FIG. 1, the MFP 10 further comprises a BT I/F 24 for performing a wireless communication in accordance with the BlueTooth (registered trademark; called "BT" below) scheme. The BT scheme is a wireless communication scheme based on IEEE standard 802.15.1, and standards conforming thereto. Moreover, the mobile terminal 50 further comprises a BT I/F 64.

Further, the wireless information storing area 40 of the MFP 10 stores in advance BT information BI for establishing a BT connection with the MFP 10. The BT information BI includes a passkey. Further, in a state in which the mobile terminal 50 is establishing a BT connection with the MFP 10, i.e., in a state in which the mobile terminal 50 is joined to the BTNW, the memory 74 of the mobile terminal 50 stores the BT information BI.

Figure 9:
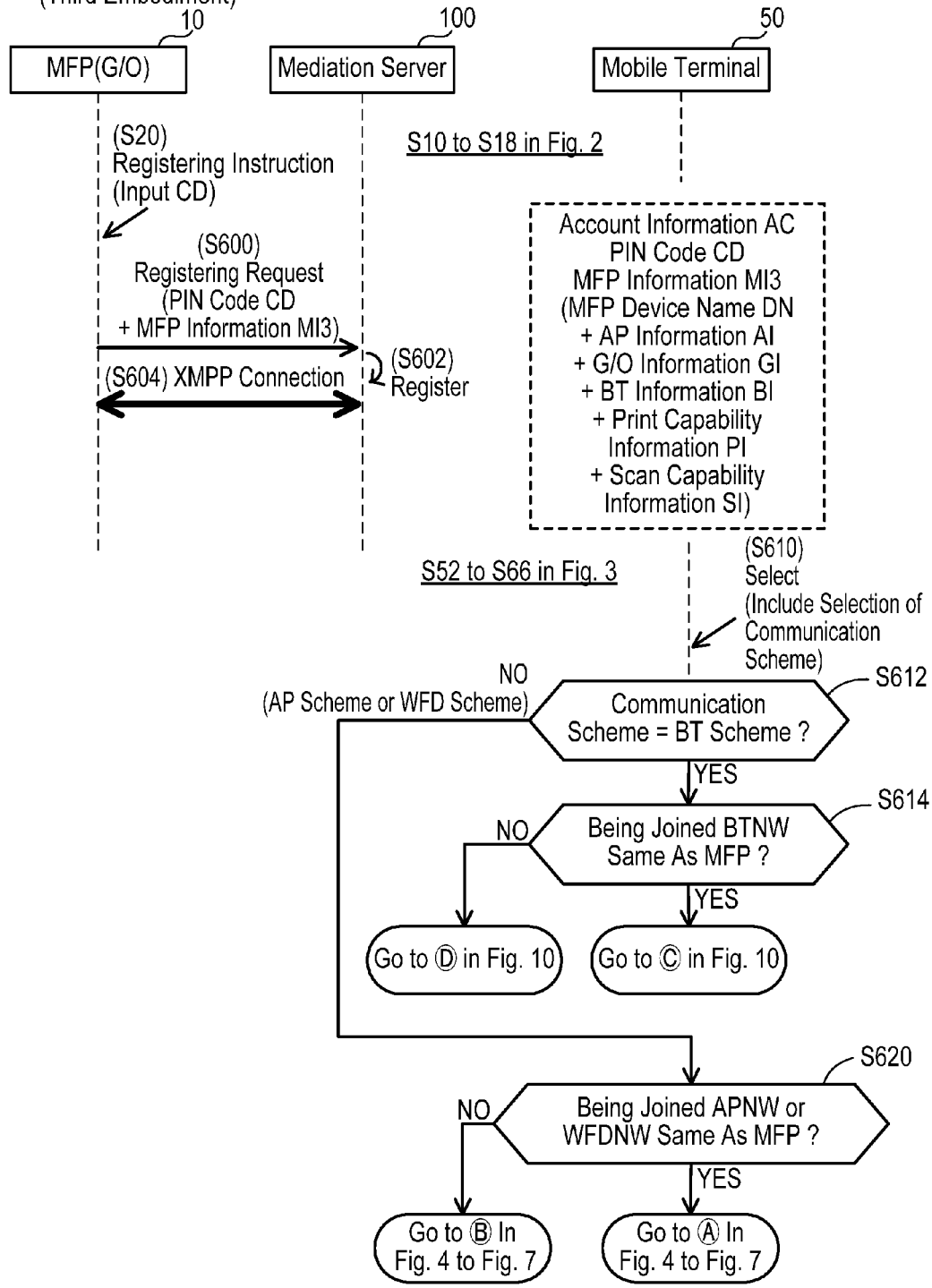
FIG. 9 shows a sequence chart for a third embodiment.

(Registering Process, Print Process and Scan Process; FIG. 9)

In the present embodiment, the registering process of FIG. 9 is performed instead of the registering process of FIG. 2. In the registering process of FIG. 9, also, S10 to S18 are performed, as in FIG. 2. In a case where the registering instruction of S20 is received from the user, in S600 the CPU 32 of the MFP 10 supplies MFP information MI3 which includes all the information stored in the wireless information storing area 40 to the mediation server 100, and registers the MFP information MI3 in the mediation server 100. In a situation where the MFP 10 is joined to the APNW, the MFP information MI3 includes the AP information AI, the G/O information GI, and the BT information BI. Further, in a situation in which the MFP 10 is not joined to the APNW, the MFP information MI3 does not include the AP information AI, but includes the G/O information GI and the BT information BI. S602 and S604 are the same as S32 and S34 of FIG. 2 (or S42 and S44).

Then, as in FIG. 3, S52 to S66 are performed. However, the setting screen of S66 further includes a button for selecting one communication scheme, from among the plurality of communication schemes, for causing the MFP 10 to perform the print function or scan function. In a situation where the MFP information MI3 includes the AP information AI, selection options of the plurality of communication schemes in the setting screen include the AP scheme, the WFD scheme, and the BT scheme. In a situation where the MFP information MI3 does not include the AP information AI, the selection options of the plurality of communication schemes in the setting screen do not include the AP scheme, but include the WFD scheme and the BT scheme.

In S610, the CPU 72 of the mobile terminal 50 receives, in the setting screen, selection of print function or scan function, selection of print condition or scan condition, and selection of communication scheme. Next, in S612, the CPU 72 determines whether the selected communication scheme is the BT scheme, and proceeds to S614 in a case where it is determined that the selected communication scheme is the BT scheme (YES in S612), and proceeds to S620 in a case where it is determined that the selected communication scheme is not the BT scheme (NO in S612).

In S614, the CPU 72 of the mobile terminal 50 determines whether the mobile terminal 50 is currently joined to the same BTNW as the MFP 10. Specifically, the CPU 72 determines whether BT information BI that matches the BT information BI in the MFP information MI3 obtained in S64 (see FIG. 3) has been stored in the memory 74. The CPU 72 proceeds to "C" of FIG. 10 in a case where the BT information BI has been stored in the memory 74 (YES in S614), and proceeds to "D" of FIG. 10 in a case where the BT information BI has not been stored in the memory 74 (NO in S614).

In S620, the CPU 72 of the mobile terminal 50 determines whether the mobile terminal 50 is currently joined to the same APNW or WFDNW as the MFP 10. Specifically, in a case where the selected communication scheme is the AP scheme, the CPU 72 determines whether AP information AI that matches the AP information AI in the MFP information MI3 has been stored in the memory 74. The CPU 72 proceeds to "A" of FIG. 4 or FIG. 6 in a case where the AP information AI has been stored in the memory 74 (YES in S620), and proceeds to "B" of FIG. 4 or FIG. 6 in a case where the AP information AI has not been stored in the memory 74 (NO in S620). Further, in a case where the selected communication scheme is the WFD scheme, the CPU 72 determines whether G/O information GI that matches the G/O information GI in the MFP information MI3 has been stored in the memory 74. The CPU 72 proceeds to "A" of FIG. 5 or FIG. 7 in a case where the G/O information GI has been stored in the memory 74 (YES in S620), and proceeds to "B" of FIG. 5 or FIG. 7 in a case where the G/O information GI has not been stored in the memory 74 (NO in S620).

(Print Process; FIG. 10)

Next, the contents of the print process performed in a case where the selected communication scheme is the BT scheme will be described with reference to FIG. 10. The processes of 700, S702, S720, S722 of the mobile terminal 50 are performed in accordance with the MFP application 80, and the other processes of the mobile terminal 50 are performed in accordance with the server application 78.

In a case where the mobile terminal 50 is currently establishing BT connection with the MFP 10 and is joined to the same BTNW as the MFP 10 (YES in S614 of FIG. 9), S700 is performed in the mobile terminal 50, as shown in "C". S700 is the same as S100 of FIG. 4. Next, in S702, the CPU 72 of the mobile terminal 50 supplies the print performing instruction to the MFP 10 via the BT I/F 64 by using the BTNW. The print performing instruction of S702 is the same as the print performing instruction of S102 of FIG. 4.

In a case where the print performing instruction of S702 is obtained from the mobile terminal 50 via the BT I/F 24 by using the BTNW, in S704 the CPU 32 of the MFP 10 causes the print engine 16 to perform the print function. S704 is the same as S104 of FIG. 4.

On the other hand, in a case where the mobile terminal 50 is not currently establishing BT connection with the MFP 10 and is not joined to the same BTNW as the MFP 10, case E1 or case E2 is realized, as shown in "D".

In S710 of case E1, the CPU 72 of the mobile terminal 50 sends, via the BT I/F 64, a BT connection request signal including the passkey in the BT information BI. The BT connection request signal is a command for requesting the MFP 10 to establish a BT connection. In case E1, since the MFP 10 is present in the vicinity of the mobile terminal 50 (e.g., within 20 m), in S712 a BT connection is established between the MFP 10 and the mobile terminal 50, and the MFP 10 joins the BTNW and the mobile terminal 50 joins the BTNW together. S720 to S724, which are performed subsequently, are respectively the same as S700 to S704.

In case E2, the BT connection request signal is sent from the mobile terminal 50 (S730). However, since the MFP 10 is not present in the vicinity of the mobile terminal 50, a BT connection is not established between the MFP 10 and the mobile terminal 50. S740 to S744, which are performed subsequently, are the same as S140 to S144 of FIG. 4.

Moreover, the scan process which is performed in a case where the selected communication scheme is the BT scheme, is not shown. The scan process is performed as follows. In a case where the mobile terminal 50 is currently establishing BT connection with the MFP 10, the CPU 72 of the mobile terminal 50 supplies the scan performing instruction to the MFP 10 via the BT I/F 64, and the CPU 32 of the MFP 10 supplies scan data to the mobile terminal 50 via the BT I/F 24. Further, in a case where the mobile terminal 50 is not currently establishing BT connection with the MFP 10, the CPU 72 of the mobile terminal 50 sends the BT connection request signal via the BT I/F 64. Then, in a case where a BT connection is established between the MFP 10 and the mobile terminal 50, the CPU 72 of the mobile terminal 50 supplies the scan performing instruction to the MFP 10 via the BT I/F 64, and the CPU 32 of the MFP 10 supplies scan data to the mobile terminal 50 via the BT I/F 24. On the other hand, in a case where a BT connection is not established between the MFP 10 and the mobile terminal 50, processes the same as S340 to S344 of FIG. 6 are performed.

In the present embodiment, also, similar results to the above embodiments can be Obtained. Further, according to the present embodiment, it is possible to cause the MFP 10 to perform the print function or scan function in accordance with the communication scheme selected by the user. In the present embodiment, the AP information AI, the G/O information GI, and the BT information BI included in the MFP information MI3 are examples of "a plurality of the network information". In the cases of FIG. 4 and FIG. 6, the APNW is an example of "specific wireless network". In the cases of FIG. 5 and FIG. 7, the WFDNW is an example of "specific wireless network". In the case of FIG. 10, the BTNW is an example of "specific wireless network".

Modification 1

The "function performing device" may not be the MFP 10 capable of performing a plurality of functions including the print function and the scan function, but may be a printer capable of performing only the print function, or may be a scanner capable of performing only the scan function.

Modification 2

The Wi-Fi I/F 20 of the MFP 10 may not be supporting the WFD scheme. In this case, the MFP 10 may start a so-called SoftAP, form a wireless NW in which the MFP 10 operates as a parent station, and register, in the mediation server 100, MFP information including information related to the wireless NW (SSID, MAC address of the MFP 10, password etc.). Further, the MFP 10 may not form a wireless NW in which the MFP 10 operates as a parent station, but may register, in the mediation server 100, MFP information including at least one of the AP information AI and the BT information BI.

Modification 3

The MFP 10 may register MFP information not including the print capability information PI in the mediation server 100. In this case, in the print process of FIG. 4, without performing conversion of the target data (i.e., S100, S120), in S102 or S122 the mobile terminal 50 supplies to the MFP 10 a print performing instruction which includes the target data and does not include the print condition. Further, in S140, the mobile terminal 50 supplies a supplying instruction which includes the target data but does not include the print condition to the mediation server 100. In S142, without performing conversion of the target data (i.e., S141), the mediation server 100 supplies to the MFP 10 a print performing instruction which includes the target data but does not include the print condition. Then, in a case where the print performing instruction is obtained from the mobile terminal 50 or the mediation server 100, the MFP 10 may perform the conversion of the target data to generate print data, and perform the print function in accordance with a default print condition.

Further, the MFP 10 may register MFP information which does not include the scan capability information SI in the mediation server 100. In this case, in the scan process of FIG. 6, the scan performing instruction and the supplying instruction may not include the scan condition. Then, the MFP 10 performs the scan function in accordance with a default scan condition. In general terms, "device information" may not include "first condition information" and "second condition information", and "first (or second) performing instruction" may not include first (or second) function performing condition.

Modification 4

The mediation server 100 may not be a server provided by Google (registered trademark), but may be, e.g., a server provided by the vendor of the MFP 10. In this case, the mobile terminal 50 may not be provided with the server application 78, and the processes of FIG. 2 to FIG. 10 may be performed in accordance with the MFP application 80 provided by the vendor of the MFP 10.

Modification 5

In the first embodiment, S24 and S26 of FIG. 2 may be omitted. In this case, S30 is performed in a case of YES in S22, and S40 is performed in a case of NO in S22.

Modification 6

In the third embodiment, the mobile terminal 50 may attempt to sequentially use a plurality of communication schemes (i.e., the AP scheme, the WFD scheme, the BT scheme) respectively without causing the user to select a communication scheme. For example, in a case where the MFP information MI3 includes the AP information AI, the G/O information GI, and the BT information BI, the mobile terminal 50 first uses the AP information AI to determine whether the mobile terminal 50 is currently joined to the APNW. The mobile terminal 50 proceeds to "A" of FIG. 4 or FIG. 6 in a case where the mobile terminal 50 is currently joined to the APNW, and proceeds to "B" of FIG. 4 or FIG. 6 in a case where the mobile terminal 50 is not currently joined to the APNW. Then, in "B" of FIG. 4 or FIG. 6, in a case where the mobile terminal 50 cannot join the APNW, the mobile terminal 50 uses the G/O information GI so as to determine whether the mobile terminal 50 is currently joined to the WFDNW. The mobile terminal 50 proceeds to "A" of FIG. 5 or FIG. 7 in a case where the mobile terminal 50 is currently joined to the WFDNW, and proceeds to "B" of FIG. 5 or FIG. 7 in a case where the mobile terminal 50 is not currently joined to the WFDNW. Then, in "B" of FIG. 5 or FIG. 7, in a case where the mobile terminal 50 cannot join the WFDNW, the mobile terminal 50 uses the BT information BI so as to determine whether the mobile terminal 50 is currently joined to the BTNW. The mobile terminal 50 proceeds to "C" of FIG. 10 in a case where the mobile terminal 50 is currently joined to the BTNW, and proceeds to "D" of FIG. 10 in a case where the mobile terminal 50 is not currently joined to the BTNW. Moreover, a sequence of using the information AI, GI, BI may be a sequence different to the sequence described above. According to the present modification, it is possible to increase the possibility of the mobile terminal 50 supplying the print performing instruction or the scan performing instruction to the MFP 10 not via the mediation server 100.

Modification 7

In the above embodiments, the target data of the print target is stored in the mobile terminal 50. Instead, the target data may be stored in a device different from the mobile terminal 50. For example, in a case where the target data is stored in the mediation server 100, the mobile terminal 50 may supply the supplying instruction to the mediation server 100 without joining the same NW as the MFP 10 by using the AP information AI, etc. As a result, the mediation server 100 can supply, to the MFP 10, the print performing instruction for causing the MFP 10 to execute printing of an image represented by the target data in the mediation server 100. That is, in a case where the target data has been stored in a device different from the mobile terminal 50, the print performing instruction may be supplied to the MFP 10 via the mediation server 100 regardless of whether the mobile terminal 50 can join the same NW as the MFP 10. In general terms, in a case where the terminal device is storing the target data of the print target, the terminal device attempts to join the wireless network by using the network information and, in accordance with the result of the attempting, it is possible to select supplying the function performing instruction to the function performing device or supplying the supplying instruction to the mediation server. In a case where the terminal device is not storing the target data of the print target, the supplying instruction may be supplied to the mediation server without performing the attempting.

Modification 8

When the device name of each MFP is obtained in, e.g., S54 of FIG. 3, the mobile terminal 50 may further obtain each NW information of each MFP (i.e., the AP information AI or the G/O information GI). Then, the mobile terminal 50 may determine for each MFP, by using the NW information of each MFP, whether the mobile terminal 50 is capable of joining the same NW as the MFP (e.g., may send a Probe Req. signal and determine whether a Probe Res. signal is received). Next, when the MFP selecting screen is displayed in S56, the mobile terminal 50 may perform the display so as to distinguish between an MFP determined capable of joining the same NW, and an MFP determined not capable of joining the same NW (e.g., by changing a display color, etc.). According to this configuration, when selecting an MFP from the MFP selecting screen, the user can select the MFP in awareness of whether the function performing instruction is to be supplied by a route via the mediation server 100 or by a route not via the mediation server 100.

Modification 9

In the above embodiments, the CPU 32 of the MFP 10 supplies the MFP information MI1, etc. which includes information related to the wireless NW to the mediation server 100 (S30, S40 of FIG. 2, S600 of FIG. 9). Instead, the CPU 32 may supply MFP information which includes information related to a wired NW to the mediation server 100. This information may be, e.g., a global IP address of a router provided with the wired NW. In this case, instead of S22 to S44 of FIG. 2, the CPU 32 obtains the global IP address from the router via the wired NW to which the MFP 10 is currently belonging, and supplies MFP information including the global IP address to the mediation server 100. On the other hand, before S72 of FIG. 3, the CPU 72 of the mobile terminal 50 determines whether the mobile terminal 50 is currently joined the wired NW and, in a case where the mobile terminal 50 is currently joined the wired NW, the mobile terminal 50 obtains the global IP address via the wired NW from the router provided with the wired NW. Then, in S72, the CPU 72 determines whether the mobile terminal 50 is joined the same NW as the MFP 10 by comparing the obtained global IP address and the global IP address included in the MFP information obtained from the mediation server 100. In a case where the two global IP addresses match (YES in S72), the CPU 72 supplies the print performing instruction to the MFP 10 by using the wired NW. In the present modification, the global IP address of the router is an example of "network information".

Modification 10

In the above embodiments, the CPU 32 of the MFP 10 and the CPU 72 of the mobile terminal 50 realize each process in FIG. 2 to FIG. 10 by performing processes in accordance with software. Instead, at least one process of the processes in FIG. 2 to FIG. 10 may be implemented by hardware such as a logic circuit.

What is claimed is:
1. A function performing device comprising:
a first function performing engine configured to perform a first function;
a processor; and
a memory that stores computer-readable instructions therein, the computer-readable instructions, when executed by the processor, causing the function performing device to perform:
supplying device information which is related to the function performing device to a mediation server so as to register the device information in the mediation server, the device information including network information which is related to a wireless network to which the function performing device currently belongs or to which the function performing device is to belong;
obtaining a first performing instruction of the first function from a terminal device not via the mediation server but via the wireless network as a result of the terminal device having joined the wireless network by using the network information included in the device information registered in the mediation server;

obtaining a second performing instruction of the first function from the mediation server as a result of the terminal device having supplied a first supplying instruction to the mediation server without joining the wireless network by using the network information included in the device information registered in the mediation server, the first supplying instruction configured to cause the mediation server to supply the second performing instruction to the function performing device; and causing the first function performing engine to perform the first function in a case where the first performing instruction or the second performing instruction is obtained.

2. The function performing device as in claim 1, wherein the device information includes access point information as the network information, the access point information being related to a first wireless network formed by an access point which is a separate device from the function performing device.

3. The function performing device as in claim 2, further comprising
a display unit,
wherein the computer-readable instructions, when executed by the processor, cause the function performing device to further perform:
causing the display unit to display a screen for inquiring whether the access point information is to be supplied to the mediation server,
wherein the supplying of the device information is performed by:
supplying the device information including the access point information in a case where it is selected, in the screen, that the access point information is to be supplied to the mediation server; and
supplying the device information not including the access point information in a case where it is selected, in the screen, that the access point information is not to be supplied to the mediation server.

4. The function performing device as in claim 3, wherein in the case where it is selected, by a user in the screen, that the access point information is not to be supplied to the mediation server, the device information includes parent station information as the network information, the parent station information being related to a second wireless network formed by the function performing device operating as a parent station.

5. The function performing device as in claim 1, wherein the device information includes parent station information as the network information, the parent station information being related to a second wireless network formed by the function performing device operating as a parent station.

6. The function performing device as in claim 1, wherein the device information includes a plurality of the network information which is related to a plurality of wireless networks to which the function performing device currently belongs or to which the function performing device is to belong,
the first performing instruction is obtained from the terminal device not via the mediation server but via a specific wireless network among the plurality of the wireless networks as a result of the terminal device having joined the specific wireless network by using at least one of the plurality of the network information included in the device information registered in the mediation server, and
the second performing instruction is obtained from the mediation server as a result of the terminal device having supplied the first supplying instruction to the mediation server without joining any of the plurality of the wireless networks by using at least one of the plurality of the network information included in the device information registered in the mediation server.

7. The function performing device as in claim 1, wherein the device information further includes first condition information which is related to the first function,
the first performing instruction or the second performing instruction further includes a first function performing condition selected from among the first condition information by a user of the terminal device, and
the first function performing engine is configured to perform the first function in accordance with the first function performing condition included in the first performing instruction or in the second performing instruction.

8. The function performing device as in claim 1, further comprising:
a second function performing engine configured to perform a second function,
wherein the computer-readable instructions, when executed by the processor, cause the function performing device to further perform:
obtaining a third performing instruction of the second function from the terminal device not via the mediation server but via the wireless network as a result of the terminal device having joined the wireless network by using the device information registered in the mediation server;
obtaining a fourth performing instruction of the second function from the mediation server as a result of the terminal device having supplied a second supplying instruction to the mediation server without joining the wireless network by using the device information registered in the mediation server, the second supplying instruction being for causing the mediation server to supply the fourth performing instruction to the function performing device; and
causing the second function performing engine to perform the second function in a case where the third performing instruction or the fourth performing instruction is obtained.

9. The function performing device as in claim 8, wherein the device information further includes first condition information which is related to the first function and second condition information which is related to the second function,
the first performing instruction or the second performing instruction further includes a first function performing condition selected from among the first condition information by a user of the terminal device,
the third performing instruction or the fourth performing instruction further includes a second function performing condition selected from among the second condition information by the user of the terminal device,
the first function performing engine is configured to perform the first function in accordance with the first function performing condition included in the first performing instruction or the second performing instruction, and the second function performing engine is configured to perform the second function in accordance with the second function performing condition included in the third performing instruction or the fourth performing instruction.

10. The function performing device as in claim 1, wherein the first function is a print function or a scan function.

11. A non-transitory computer-readable recording medium storing computer-readable instructions for a terminal device,
the computer-readable instructions, when executed by a processor of the terminal device, causing the terminal device to perform:
obtaining device information from a mediation server after the device information has been registered in the mediation server by a function performing device, the device information including network information which is related to a wireless network to which the function performing device currently belongs or to which the function performing device is to belong;
attempting to join the wireless network by using the network information included in the obtained device information;
supplying a first function performing instruction to the function performing device not via the mediation server but via the wireless network in a case where the terminal device has joined the wireless network as a result of the attempting; and
supplying a supplying instruction to the mediation server in a case where the terminal device has not joined the wireless network as a result of the attempting, the supplying instruction being for causing the mediation server to supply a second function performing instruction to the function performing device.

12. The non-transitory computer-readable recording medium as in claim 11, wherein
the network information includes access point identification information for identifying an access point which is configured as a separate device from the function performing device, and
the attempting includes:
searching for the access point by using the access point identification information; and
establishing a wireless connection with the access point so as to join the wireless network in a case where it is capable of finding the access point as a result of the searching; and
wherein the terminal device does not join the wireless network in a case where it is not capable of finding the access point.

13. The non-transitory computer-readable recording medium as in claim 11, wherein
the first function performing instruction and the second function performing instruction are for causing the function performing device to perform a print function for printing an image represented by target data stored in the terminal device,
wherein the computer-readable instructions, when executed by the processor, cause the terminal device to further perform:
converting the target data so as to generate first print data having a data format which can be interpreted by the function performing device,
wherein the first function performing instruction includes the first print data,
the supplying instruction includes the target data, and
the supplying instruction is for causing the mediation server to convert the target data included in the supplying instruction so as to generate second print data and to supply the second function performing instruction including the second print data to the function performing device, the second print data having a data format which can be interpreted by the function performing device.

14. The non-transitory computer-readable recording medium as in claim 11, wherein
the computer-readable instructions, when executed by the processor, cause the terminal device to further perform:
determining, by using the network information included in the obtained device information, whether the terminal device is currently joined to the wireless network,
wherein in a case where it is determined that the terminal device is not currently joined to the wireless network, the attempting is performed,
in a case where it is determined that the terminal device is currently joined to the wireless network, the attempting is not performed, and
in the case where it is determined that the terminal device is currently joined to the wireless network, the first function performing instruction is supplied to the function performing device not via the mediation server but via the wireless network.

15. A function performing system comprising:
a function performing device; and
a terminal device,
the function performing device comprises:
a function performing engine configured to perform a specific function;
a first processor; and
a first memory that stores first computer-readable instructions therein, the first computer-readable instructions, when executed by the first processor, causing the function performing device to perform:
supplying device information which is related to the function performing device to a mediation server so as to register the device information in the mediation server, the device information including network information which is related to a wireless network to which the function performing device currently belongs or to which the function performing device is to belong;
obtaining a first function performing instruction from the terminal device not via the mediation server but via the wireless network;
obtaining a second function performing instruction from the mediation server; and
causing the function performing engine to perform the specific function in a case where the first function performing instruction or the second function performing instruction is obtained from the terminal device or the mediation server, and
wherein the terminal device comprises:
a second processor; and
a second memory that stores second computer-readable instructions therein, the second computer-readable instructions, when executed by the second processor, causing the terminal device to perform:
obtaining the device information from the mediation server after the device information has been registered in the mediation server;

attempting to join the wireless network by using the network information included in the obtained device information;

supplying the first function performing instruction to the function performing device not via the mediation server but via the wireless network in a case where the terminal device has joined the wireless network as a result of the attempting; and supplying a supplying instruction to the mediation server in a case where the terminal device has not joined the wireless network as a result of the attempting, the supplying instruction being for causing the mediation server to supply the second function performing instruction to the function performing device.

16. The function performing system as in claim 15, wherein
the device information includes access point information as the network information, the access point information being related to a first wireless network formed by an access point which is configured as a separate device from the function performing device.

17. The function performing system as in claim 15, wherein
the device information includes parent station information as the network information, the parent station information being related to a second wireless network formed by the function performing device operating as a parent station.

18. A function performing device comprising:
a first function performing engine configured to perform a first function;
a processor; and
a memory that stores computer-readable instructions therein, the computer-readable instructions, when executed by the processor, causing the function performing device to perform:

supplying device information which is related to the function performing device to a mediation server so as to register the device information in the mediation server, the device information including network information which is related to a network to which the function performing device currently belongs or to which the function performing device is to belong;

obtaining a first performing instruction of the first function from a terminal device not via the mediation server but via the network as a result of the terminal device having joined the network by using the network information included in the device information registered in the mediation server;

obtaining a second performing instruction of the first function from the mediation server as a result of the terminal device having supplied a first supplying instruction to the mediation server without joining the network by using the network information included in the device information registered in the mediation server, the first supplying instruction configured to cause the mediation server to supply the second performing instruction to the function performing device; and causing the first function performing engine to perform the first function in a case where the first performing instruction or the second performing instruction is obtained.

* * * * *